United States Patent [19]

Capps et al.

[11] Patent Number: 4,910,699

[45] Date of Patent: Mar. 20, 1990

[54] OPTICAL COMPUTER INCLUDING PARALLEL RESIDUE TO BINARY CONVERSION

[75] Inventors: C. David Capps, Seattle; R. Aaron Falk, Renton, both of Wash.

[73] Assignee: The Boeing Company, Seattle, Wash.

[21] Appl. No.: 233,610

[22] Filed: Aug. 18, 1988

[51] Int. Cl.⁴ ........................... G06F 7/38; G06F 7/56

[52] U.S. Cl. ........................................ 364/746; 364/713

[58] Field of Search ............... 364/746, 713, 600, 601, 364/822; 341/137; 350/96.11

[56] References Cited

U.S. PATENT DOCUMENTS

| | | | |
|---|---|---|---|
| 3,680,080 | 7/1972 | Maure | 340/347 |
| 4,064,400 | 12/1977 | Akushsky et al. | 364/746 |
| 4,121,298 | 10/1978 | Akushsky et al. | 364/746 |
| 4,363,106 | 12/1982 | Tai | 364/746 |
| 4,418,394 | 11/1983 | Tai | 364/746 |
| 4,567,355 | 1/1986 | Schuoecker et al. | 364/746 |
| 4,797,843 | 1/1989 | Falk et al. | 364/713 |

OTHER PUBLICATIONS

D. Casasent et al., "*Decimal/Residue/Decimal Optical Converters*", Optics Communications, vol. 27, No. 3, Dec. 1978, pp. 317–320.

A. Huange, Y. Tsunda, J. W. Goodman and S. Ishihara, "Optical Computation Using Residue Arithmetic", Appl. Opt. 18, 149–162 (1979).

F. A. Horrigan and W. W. Stoner, "Residue-Based Optical Processor", *Proc. SPIE* 185, 19–27 (1979).

P. R. Beaudet, A. P. Goutzoulis, E. C. Malarkey and J. C. Bradley, "Residue Arithmetic Techniques for Optical Processing of Adaptive Phased Array Radars", *Appl. Opt.* 25, 3097–3112 (1986).

R. E. Altschul, D. D. Miller and J. N. Polky, "Residue Divison Using the Core Function", *Proceedings IEEE International Symposium on Circuits and Systems,* 126–131 (1987).

A. Migus, D. Hulin, A. Mysyrowicz, A. Antonetti, W. T. Masselink, H. Morkoc, H. M. Gibbs and N. Peyghambarian, "An Ultrafast All Optical Gate with Subpicosecond on and off Response Time", *Tech Dig.* CLEO '86, ThU9, San Francisco (1986).

M. C. Nuss, W. Zinth and W. Kaiser, "Femtosecond Carrier Relaxation in Semiconductor-doped Glasses", *Tech. Dig. XIV Int. Quantum Elect. Conf.* (*IQEC*), MBB2, San Francisco (1986).

D. W. Hall and N. F. Borrelli, "Physical and Optical Properties of Cd(Se,S) Microcrystallites in Galss", *OSA Tech. Dig. Series,* vol. 13, Topical Meeting on Photonic Switching, FC4, Incline Village, New York (1987).

F. J. Taylor, "Residue Arithmetic: A Tutorial with Examples", *Computer* 17, No. 5, 50–62 (May 1984).

Psaltis, D. Casasent, "Optical Residue Arithmetic: A Correlation Approach", *Applied Optics,* 18, 163–171 (1979).

Neyer, "Electro-Optic X-Switch Using Single-Mode Ti:$LiNbO_3$ Channel Waveguides", *Electronic Letters,* vol. 19, No. 14, Jul. 7, 1983.

D. H. Schaefer and J. P. Strong, III, "Tse Computers", Proceedings of the IEEE, vol. 65, No. 1 (Jan. 1977).

Atsuya Seko, "All-Optical Parallel Logic Operation Using Fiber Laser Plate for Digital Image Processing", Appl. Phys. Lett. 37(3), Aug. 1980.

S. A. Collins et al, "Optical Logic Gates Using a Hughes Liquid Crystal Light Valve", SPIE vol. 232, International Optical Computing Conference, 1980.

*Primary Examiner*—Gary V. Harkcom

*Assistant Examiner*—Long T. Nguyen

*Attorney, Agent, or Firm*—Foley & Lardner, Schwartz, Jeffery, Schwaab, Mack, Blumenthal & Evans

[57] ABSTRACT

An optical computing system includes an input device, a converter and an optical computing device. The input device generates first light beams along selected ones of a first plurality of light transmitting paths. Each of the first light beams is representative of a digit of a number. The converter converts the first light beams into second light beams selected among a second plurality of light transmitting paths. Each of the second light beams is representative of the residue of the number modulo a given modulus among a plurality of mutually prime moduli. The converter generates, for each number, an ordered group of second light beams corresponding to an ordered group of residues modulo each of the mutually prime moduli. The optical computing device is coupled to receive the ordered group of second light beams from the converter for performing residue arithmetic operations.

56 Claims, 24 Drawing Sheets

FIG. 1
PRIOR ART

| DECIMAL NUMBER | | RESIDUE REPRESENTATION | | |
|---|---|---|---|---|
| $a_1$ | $a_0$ | 2 | 3 | 5 |
| | 0 | 0 | 0 | 0 |
| | 1 | 1 | 1 | 1 |
| | 2 | 0 | 2 | 2 |
| | 3 | 1 | 0 | 3 |
| | 4 | 0 | 1 | 4 |
| | 5 | 1 | 2 | 0 |
| | 6 | 0 | 0 | 1 |
| | 7 | 1 | 1 | 2 |
| | 8 | 0 | 2 | 3 |
| | 9 | 1 | 0 | 4 |
| 1 | 0 | 0 | 1 | 0 |
| 1 | 1 | 1 | 2 | 1 |
| 1 | 2 | 0 | 0 | 2 |
| 1 | 3 | 1 | 1 | 3 |
| 1 | 4 | 0 | 2 | 4 |
| 1 | 5 | 1 | 0 | 0 |
| 1 | 6 | 0 | 1 | 1 |
| 1 | 7 | 1 | 2 | 2 |
| 1 | 8 | 0 | 0 | 3 |
| 1 | 9 | 1 | 1 | 4 |
| 2 | 0 | 0 | 2 | 0 |
| 2 | 1 | 1 | 0 | 1 |
| 2 | 2 | 0 | 1 | 2 |
| 2 | 3 | 1 | 2 | 3 |
| 2 | 4 | 0 | 0 | 4 |
| 2 | 5 | 1 | 1 | 0 |
| 2 | 6 | 0 | 2 | 1 |
| 2 | 7 | 1 | 0 | 2 |
| 2 | 8 | 0 | 1 | 3 |
| 2 | 9 | 1 | 2 | 4 |
| 3 | 0 | 0 | 0 | 0 |

RADIX 7 OUTPUT
|a|7

RADIX 7 OUTPUT
|a| 10|7

F/G. 16
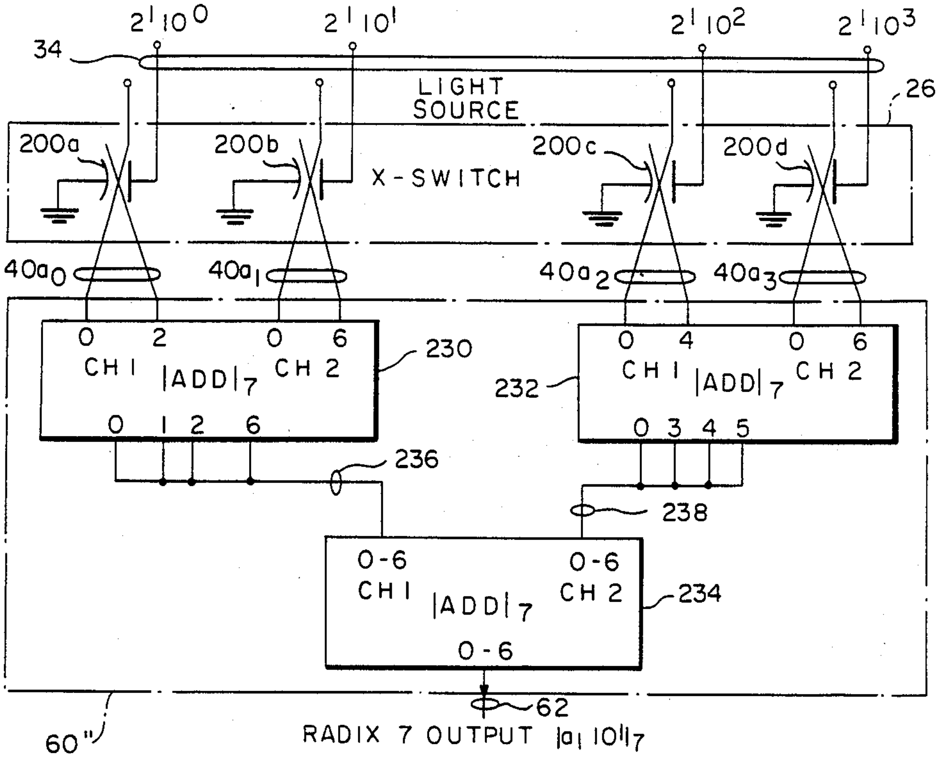
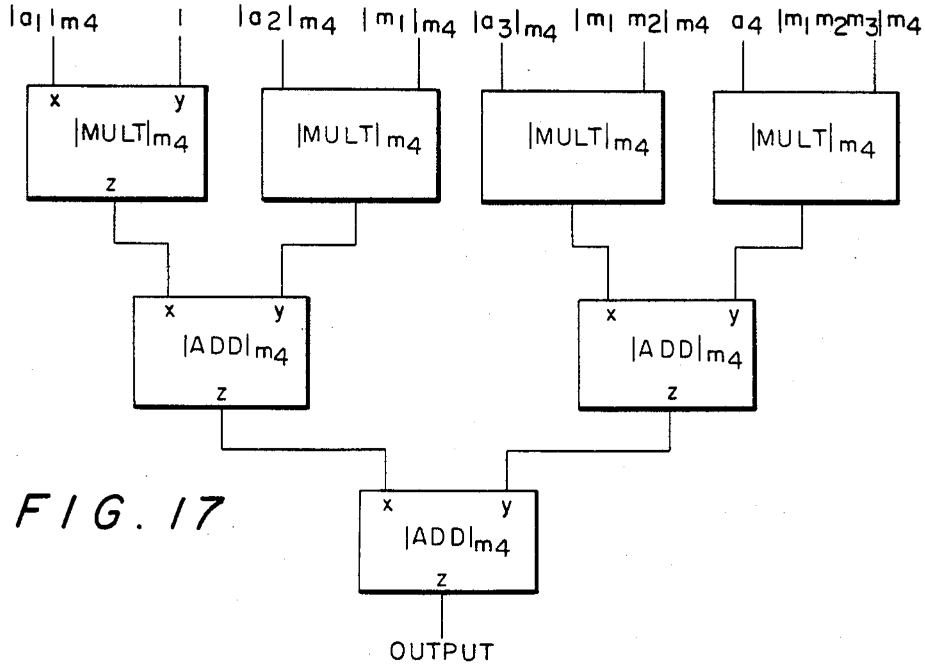
F/G. 17

| x2 \ x1 | 0 | 1 |
|---|---|---|
| 0 | 0 | 0 |
| 1 | 0 | 1 |

FIG. 22A

| x2 \ x1 | 0 | 1 |
|---|---|---|
| 0 | 0 | 1 |
| 1 | 1 | 0 |

FIG. 22B

MULTIPLY r = 3

| | 0 | 1 | 2 |
|---|---|---|---|
| 0 | 0 | 0 | 0 |
| 1 | 0 | 1 | 2 |
| 2 | 0 | 2 | 1 |

FIG. 22D

| x2 \ x1 | 0 | 1 | 2 |
|---|---|---|---|
| 0 | 0 | 1 | 2 |
| 1 | 1 | 2 | 0 |
| 2 | 2 | 0 | 1 |

FIG. 22C

| x2 \ x1 | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |

FIG. 23A

| x2 \ x1 | 0 | 1 | 2 | 4 | 3 |
|---|---|---|---|---|---|
| 0 | 0 | 0 | 0 | 0 | 0 |
| 1 | 0 | 1 | 2 | 4 | 3 |
| 2 | 0 | 2 | 4 | 3 | 1 |
| 4 | 0 | 4 | 3 | 1 | 2 |
| 3 | 0 | 3 | 1 | 2 | 4 |

FIG. 23B

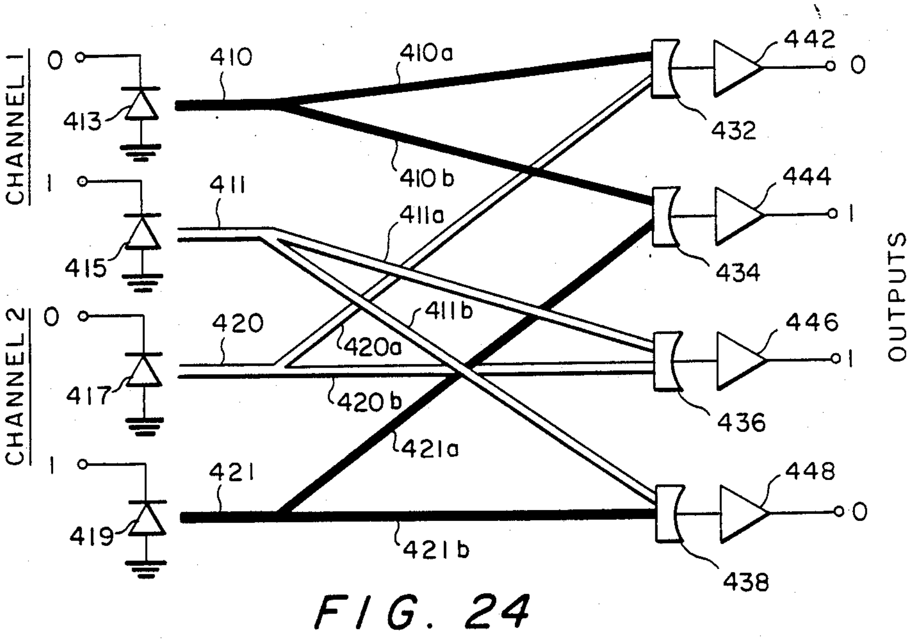
FIG. 24
FIG. 25
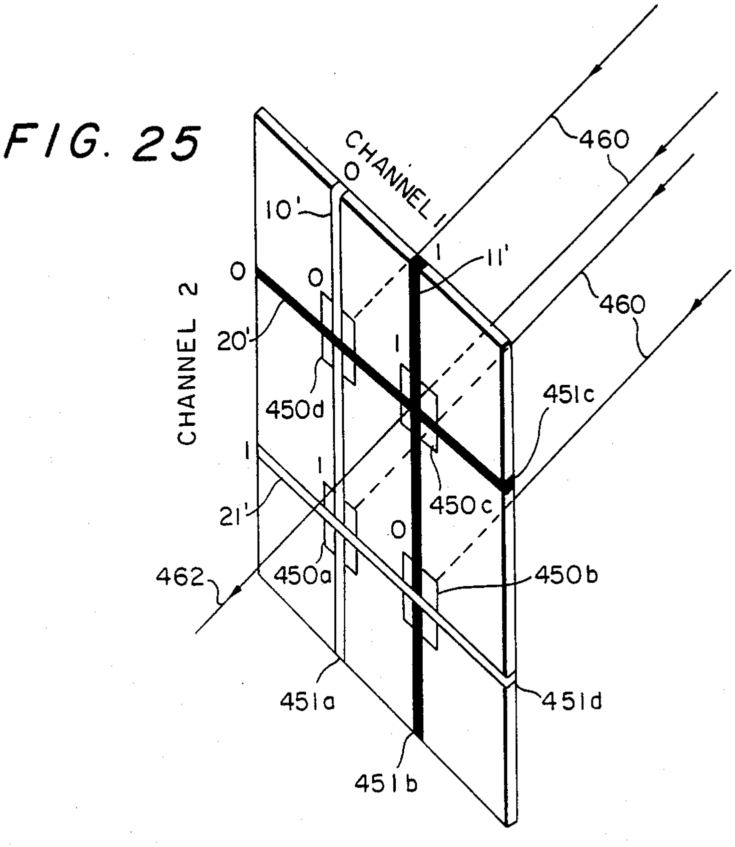

FIG. 28
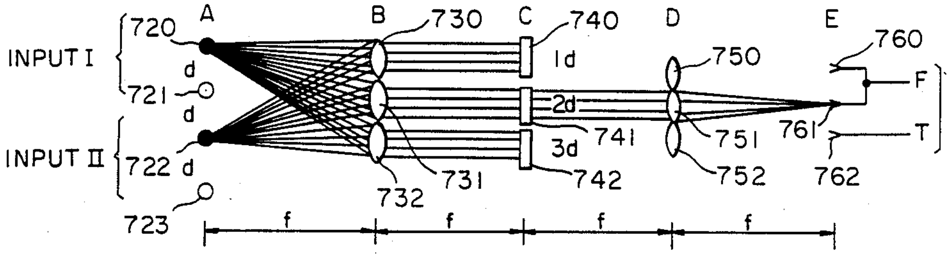
FIG. 29
| INPUT I 720 (T) | INPUT I 721 (F) | INPUT II 722 (F) | INPUT II 723 (T) | SPACING BETWEEN POINT SOURCES 20-23 | OUTPUT |
|---|---|---|---|---|---|
| ● | ○ | ○ | ● | 3d | T |
| ● | ○ | ● | ○ | 2d | F |
| ○ | ● | ○ | ● | 2d | F |
| ○ | ○ | ● | ○ | 1d | F |
● - SOURCE ON
○ - SOURCE OFF
FIG. 30
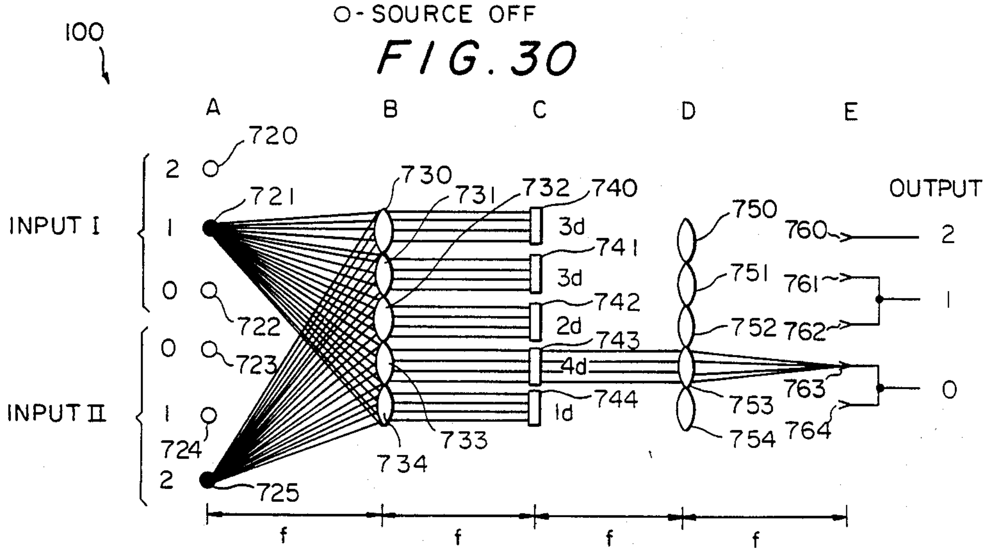

| RELATION | INPUT I (720) 2 | INPUT I (721) 1 | INPUT I (722) 0 | INPUT II (723) 0 | INPUT II (724) 1 | INPUT II (725) 2 | SPACING BETWEEN POINT SOURCES 120-125 | OUTPUT |
|---|---|---|---|---|---|---|---|---|
| 0 + 0 = 0 | ○ | ○ | ● | ● | ○ | ○ | 1d | 0 |
| 0 + 1 = 1 | ○ | ○ | ● | ○ | ● | ○ | 2d | 1 |
| 0 + 2 = 2 | ○ | ○ | ● | ○ | ○ | ● | 3d | 2 |
| 1 + 0 = 1 | ○ | ● | ○ | ● | ○ | ○ | 2d | 1 |
| 1 + 1 = 2 | ○ | ● | ○ | ○ | ● | ○ | 3d | 2 |
| 1 + 2 = 0 | ○ | ● | ○ | ○ | ○ | ● | 4d | 0 |
| 2 + 0 = 2 | ● | ○ | ○ | ● | ○ | ○ | 3d | 2 |
| 2 + 1 = 0 | ● | ○ | ○ | ○ | ● | ○ | 4d | 0 |
| 2 + 2 = 1 | ● | ○ | ○ | ○ | ○ | ● | 5d | 1 |

● - SOURCE ON

○ - SOURCE OFF

FIG. 31

| DECIMAL | RESIDUE | | | BINARY | | | | |
|---|---|---|---|---|---|---|---|---|
| | 2 | 3 | 5 | $2^4$ | $2^3$ | $2^2$ | $2^1$ | $2^0$ |
| 0 | 0 | 0 | 0 | 0 | 0 | 0 | 0 | 0 |
| 1 | 1 | 1 | 1 | 0 | 0 | 0 | 0 | 1 |
| 2 | 0 | 2 | 2 | 0 | 0 | 0 | 1 | 0 |
| 3 | 1 | 0 | 3 | 0 | 0 | 0 | 1 | 1 |
| 4 | 0 | 1 | 4 | 0 | 0 | 1 | 0 | 0 |
| 5 | 1 | 2 | 0 | 0 | 0 | 1 | 0 | 1 |
| 6 | 0 | 0 | 1 | 0 | 0 | 1 | 1 | 0 |
| 7 | 1 | 1 | 2 | 0 | 0 | 1 | 1 | 1 |
| 8 | 0 | 2 | 3 | 0 | 1a | 1 | 0 | 0 |
| 9 | 1 | 0 | 4 | 0 | 1b | 0 | 0 | 1 |
| 10 | 2 | 1 | 2 | 0 | 1c | 0 | 1 | 0 |
| 11 | 1 | 2 | 1 | 0 | 1d | 0 | 1 | 1 |
| 12 | 0 | 0 | 2 | 0 | 1e | 1 | 0 | 0 |
| 13 | 1 | 1 | 3 | 0 | 1f | 1 | 0 | 1 |
| 14 | 0 | 2 | 4 | 0 | 1g | 1 | 1 | 0 |
| 15 | 1 | 0 | 0 | 0 | 1h | 1 | 1 | 1 |
| 16 | 0 | 1 | 1 | 1 | 0 | 0 | 0 | 0 |
| 17 | 1 | 2 | 2 | -1 | 0 | 0 | 0 | 1 |
| 18 | 0 | 0 | 3 | 1 | 0 | 0 | 1 | 0 |
| 19 | 1 | 1 | 2 | 1 | 0 | 0 | 1 | 1 |
| 20 | 0 | 2 | 0 | 1 | 0 | 1 | 0 | 0 |
| 21 | 1 | 0 | 1 | 1 | 0 | 1 | 0 | 1 |
| 22 | 0 | 1 | 2 | 1 | 0 | 1 | 1 | 0 |
| 23 | 1 | 2 | 3 | 1 | 0 | 1 | 1 | 1 |
| 24 | 0 | 0 | 2 | 1 | 1i | 0 | 0 | 0 |
| 25 | 1 | 1 | 0 | 1 | 1j | 0 | 0 | 1 |
| 26 | 0 | 2 | 1 | 1 | 1k | 0 | 1 | 0 |
| 27 | 1 | 0 | 2 | 1 | 1ℓ | 0 | 1 | 1 |
| 28 | 0 | 1 | 3 | 1 | 1m | 1 | 0 | 0 |
| 29 | 1 | 2 | 4 | 1 | 1n | 1 | 0 | 1 |

FIG. 35

FIG. 38
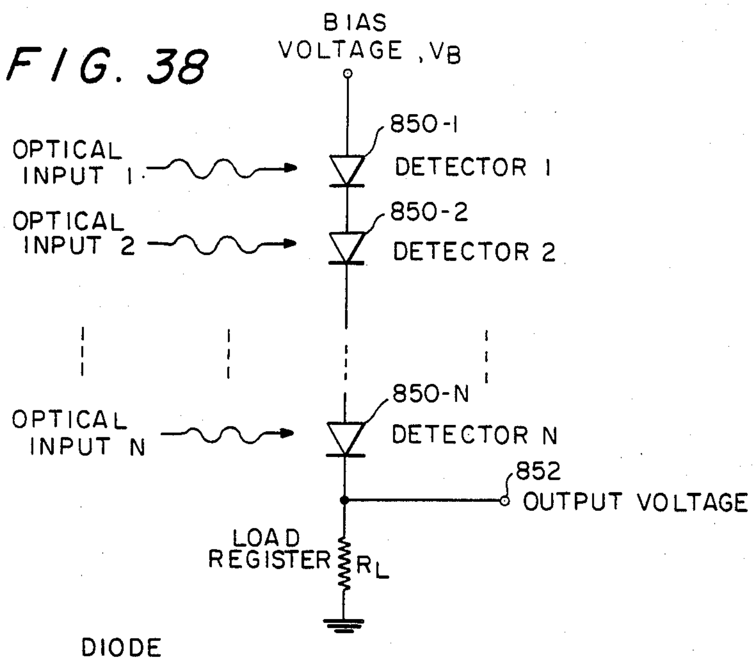
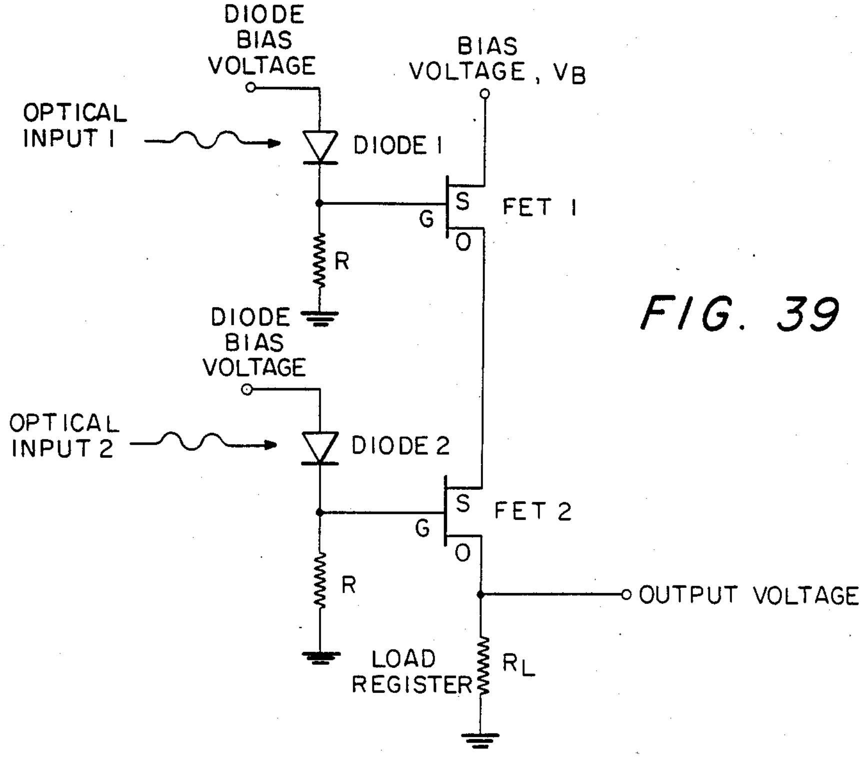
FIG. 39

OPTICAL COMPUTER INCLUDING PARALLEL RESIDUE TO BINARY CONVERSION

BACKGROUND OF THE INVENTION

The invention is in the field of optical computing and is directed to the use of the residue number system in an optical data processor for performing logic and carry-free arithmetic operations. The invention is more particularly directed to said apparatus utilizing parallel residue-to-binary conversion.

The residue number system, RNS, has received considerable attention in recent times as an effective tool for performing single step, parallel computation of sums, differences and products. A digital system employing the RNS may be used for high speed, real time parallel processing of integer-valued data.

The following publications, incorporated herein by reference, are relevant to the background of the RNS and its application to high speed data processing.

REFERENCES (1) A. Huang, Y. Tsunda, J. W. Goodman, and S. Ishihara, *Appl. Opt.* 18, 149–162 (1979).

(2) F. A. Horrigan and W. W. Stoner, *Proc. SPIE* 185, 19–27 (1979).

(3) S. F. Habiby and S. A. Collins, *Optical Information Processing for Aerospace Applications II,* NASA Conf. Pub. 2302, 215–229 (1983).

(4) P. R. Beaudet, A. P. Goutzoulis, E. C. Malarkey, and J.C. Bradley, *Appl. Opt.* 25, 3097–3112 (1986).

(5) R. E. Altschul, D. D. Miller, and J. N. Polky, *Proceedinqs IEEE International Symposium on Circuits and Systems,* 126–131 (1987).

(6) A. Migus, D. Hulin, A. Mysyrowicz, A. Antonetti, W. T. Masselink, H. Morkoc, H. M. Gibbs, and N. Peyghambarian, *Tech. Diq.* CLEO '86, ThU9, San Francisco (1986).

(7) M. C. Nuss, W. Zinth, and W. Kaiser, *Tech. Dig. XIV Itt. Ouantum Elect. Conf.* (*IOEC*). MBB2, San Francisco (1986).

(8) D. W. Hall and N. F. Borrelli, *OSA Tech. Dig. Series.* Vol 13, Topical Meeting on Photonic Switching, FC4, Incline Village, N.Y. (1987).

(9) N. S. Szabo and R. I. Tanaka, *Residue Arithmetic and Its Applications to Computer Technology,* (McGraw Hill, New York, 1967).

(10) F. J. Taylor, *Computer* 17, No. 5, 50–62 (May 1984).

(11) R. T. Gregory and E. V. Krishnamurthy, *Methods and Applications of Error-Free Computation* (Springer-Verlag, New York, 1984).

(12) O. Psaltis, D. Casasent, "Optical Residuè Arithmetic: A Correlation Approach", *Applied Optics.* 18, 163–171 (1979).

Although optical data processing has achieved some degree of success via analog devices, progress in optical digital processing has been slow. One major drawback in conventional designs of an optical digital processor has been the arithmetic/logic unit (ALU). Several solutions for a practical optical ALU are described in copending applications Ser. No. 019,767, filed Feb. 27, 1987, entitled "Parallel Optical Arithmetic/Logic Unit" (U.S. Pat. No. 4,797,843) and Ser. No. 019,761, filed Feb. 27, 1987, entitled "Optical Cross Bar Arithmetic/-Logic Unit," incorporated herein by reference.

Current work in optical computing has emphasized parallel architectures that gain in effective throughput by performing multiple operations simultaneously. However, the throughput gain is typically at the expense of large time delays associated with updating the input information or the operation being performed. These delays cause difficulty for a general purpose computer architecture or other architectures that need to be rapidly reconfigured.

Much work on optical RNS arithmetic processors has been based on the switching of maps connecting one of the input numbers to the output number with map selection determined by the second input number (references 1 and 3). A particularly interesting demonstration of this approach is the work of Habiby and Collins (reference 3) in which an optically addressable spatial light modulator is used for the switchable map element. The difficulty with these approaches is that current technology does not support switchable maps which can compete in speed with equivalent electronic methods. As discussed in the above-referenced application Ser. No. 019,761, an optical crossbar architecture perform multi-valued logic functions in a single, parallel operations step and thus alleviates the above problem by eliminating the switchable maps. In particular, this architecture can be applied to RNS computing as a subset of multi-valued logic. The use of fixed optical interconnects to a set of parallel threshold devices takes advantage of the low dispersion and parallel interconnection properties of photons. Additionally, current work on optical non-linear devices for performing the necessary threshold logic has already demonstrated picosecond switching speeds (See references 6–8). Thus, the crossbar architecture is ultimately scalable to these ultrahigh processing speeds.

SUMMARY OF THE INVENTION

It is an object of the invention to provide an optical residue-to-binary converter.

It is a further object of the invention to provide an optical converter for performing parallel conversions of numbers represented in a residue representation into binary electrical signals.

Yet another object of the invention is to provide an optical computing system which incorporates a parallel residue-to-binary converter In accordance with applicants, invention, an optical computing system is described which includes input means, converter means, optical computing means and residue-to-binary converter means. The input means is provided for generating first light beams along selected ones of a first plurality of light transmitting paths wherein each of the first light beams is representative of a digit of a number. The converter means is provided for converting the first light beams into second light beams selected among a second plurality of light transmitting paths. Each of the second light beams is representative of the residue of the number modulo a given modulus among a plurality of mutually prime moduli. The converter means generates, for each number, a group of second light beams corresponding to an ordered group of residues modulo each of the mutually prime moduli. The optical computing means is coupled to receive the group of second light beams from the converter means for performing parallel residue arithmetic operations corresponding to each ordered group of residues. The optical computing means further generates a third light beams selected among a third plurality of light transmitting paths. Each of the third light beams is representative of a computed number resulting from the arithmetic operations an corresponding to the ordered group of residues modulo each of the mutually prime moduli. The residue-to-binary converter means is provided for converting the third light beams into binary electrical signals representative of a binary value of the computed number.

In accordance with another aspect of the invention, there is provided an opto-electric residue-to-binary converter which comprises a plurality of converter units, and means for connecting each converter unit in parallel. One converter unit is provided to correspond to each binary digit and provides a binary electrical output signal corresponding thereto. Each group of light sources for each converter unit includes a corresponding plurality of individually energizable light sources representative of residues of a number modulo a given modulus. The residues of each group are mutually prime relative to one another. The number is thus represented in a residue number representation by the energizable light sources. The connecting means are provided such that corresponding individually energizable light sources within each converter unit are simultaneously energized for converting the number from residue number representation into binary. Each converter unit further comprises a plurality of light transmitting paths for each group of light sources, a plurality of photo-electric detectors and a plurality of threshold detectors. Each o the photo-electric detectors receives light from a selected light transmitting path such that for every given binary digit of the binary electrical signal, a given binary state of the binary digit corresponds to a unique selection of the light transmitting paths corresponding to the residues of the number modulo the mutually prime moduli.

BRIEF DESCRIPTION OF THE DRAWINGS

These and other objects and advantages of the invention will become more clear in relation to the drawings wherein:

FIG. 1 is a number representation table showing the relationship between a digital number and a residue representation thereof;

FIG. 16 is a third embodiment of an electro-optical converter and residue converter of FIG. 6;

FIGS. 17–20 are block diagrams of additional embodiments of the residue converter of FIG. 6 for a mixed radix representation;

FIGS. 22A–22D show examples of truth tables utilized in fabricating the arithmetic/logic units;

FIGS. 23A–23B show a modulo 5 residue multiplication table and its permuted table, respectively;

FIG. 24 is a schematic representation of an optical arithmetic and logic unit implementing an exclusive-OR operation;

FIG. 25 is a schematic representation of another embodiment of an exclusive-OR operation of the arithmetic/logic units;

FIG. 28 is a schematic drawing of a parallel optical arithmetic/logic unit implementing an AND function;

FIG. 29 is a truth table for the parallel optical logic shown, in FIG. 28;

FIG. 30 is a schematic drawing of a parallel optical modulo 3 adder utilized as an arithmetic/logic unit;

FIG. 31 is an input/output table for the parallel optical adder shown in FIG. 30;

FIG. 35 is a number representation table illustrating the conversion between decimal, residue and binary representations.

FIG. 38 is a first embodiment of a multiple input AND logic circuit; and

FIG. 39 is a second embodiment of a multiple input AND logic circuit.

DETAILED DESCRIPTION OF THE PREFERRED EMBODIMENTS

I. Introduction

Figure 2:
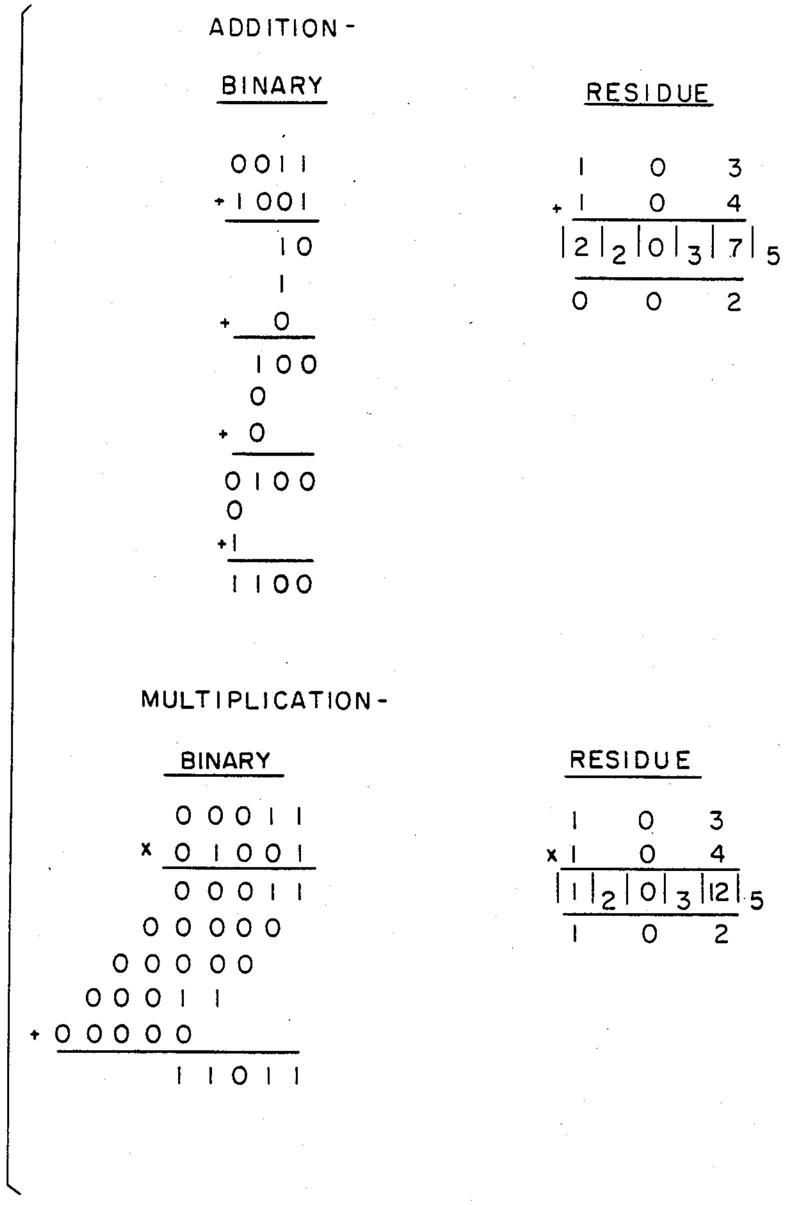
FIG. 2 PRIOR ART
FIG. 2 is a table illustrating a comparison between conventional binary arithmetic and residue arithmetic.

Historically, binary digital devices have dominated the computing field. The acceptance of binary is due in large part to the natural relationship between binary digital architectures and solid state integrated circuit technology. The latter readily supports high speed on-off switching while having limited interconnect capability, (planar and nearest neighbors). Binary digital architectures are a good fit to these capabilities as they require only on-off switching and allow designs that can to a large degree minimize the number, while maximizing the locality, of the interconnects.

In optical binary computing, on-off switching is also the preferred means of performing logic decisions. Unlike electronics, however, optical devices readily support complex, global interconnect architectures. This difference between electronic and optic technologies suggests that alternatives to binary systems would prove fruitful. In accordance with the principles of the invention, positionally encoded residue numbers are utilized to achieve carry-free arithmetic calculations. As a non-limiting example of such carry-free arithmetic operations, the invention is described in reference to parallel processing architectures. Positionally encoded residue number processing trades an increased complexity of interconnects with the ability to perform single step sums, differences and products using a parallel set of AND or threshold type logic gates. This latter architecture represents a more optimum match with optics technology than traditional binary computing. In fact, the devices described later have potential for $10^{12}$ Hz operation.

II. Theory of Residue Number Systems

The first historical description of the use of residue numbers is attributed to the Chinese and the Greeks approximately 1700 years ago. The first complete mathematical description of residue arithmetic was produced by K. F. Gauss in the nineteenth century. In the late sixties, Szabo and Tanaka (reference 9) produced a landmark treatise on the application of RNS to digital computing. This work went largely unknown to the majority of workers in the computing community, due in part to a lack of RNS hardware hat could compete with the rapidly emerging semiconductor binary devices of the time. Recently, there has been a renewed interest in using RNS in solving a number of problems that prove difficult using binary representation. Reference 10 provides a more complete history of the RNS.

The most commonly used number representation is a fixed base or fixed radix representation. In this representation a positive integer, x, is indicated by writing down an ordered set of integer coefficients, $a_i$, (i=0, 1, . . . n−1, where n is an integer) that are defined with respect to a positive integer base, b>1, by the equation $$x = \sum_{i=0}^{n-1} a_i b^i \quad (1)$$

The largest integer that can be represented is given by $b^n-1$ Fractions are represented by allowing the index in equation (1) to include negative values or equivalently, by rescaling by a power of the base Only certain fractions (inverses) can be represented exactly, with others requiring truncation of an infinite series. Negative numbers are typically indicated by letting the value of the $a_{n-1}$ coefficient indicate sign as in one's and two's complement representation in binary. This process for indicating sign simply splits the number ordinate into two parts, one representing positive numbers and one representing negative numbers.

In RNS, a number is written as an n-tuple with respect to a set of mutually prime moduli, $m_i>1$. The algorithm for determining the $i^{th}$ entry into the ntuple is to divide the number by the $i^{th}$ modulus and enter the remainder, i.e., the residue, into that position. This process is represented mathematically by $$\overline{R}=(r_1, r_2, \ldots, r_n)$$

where, $$r_i=|x|_{m_i}=x \bmod m_i \quad (2)$$

with the $r_i$ being the residues and the $m_i$ being the chosen modulus. The largest number of consecutive integers that can be represented uniquely is $$M = \prod_{i=1}^{n} M_i \quad (3)$$

Common choices of range are:

| | | |
|---|---|---|
| (1) | $X_{min} = 0$ | $X_{max} = M - 1$ (any M) |
| (2) | $X_{min} = -(M/2)$ | $X_{max} = (M/2) - 1$ (M even) |
| (3) | $X_{min} = -(M-1)/2$ | $X_{max} = (M-1)/2$ (M odd) |

The range can be made large through the use of a few, relatively small moduli. For example, using the five primes 5, 7, 11, 13, 17 as the moduli gives a range greater than 16 bits and choosing the first primes, 2 through 29, gives a range of greater than 32 bits. FIG. 1 shows the relationship between the fixed base (base 10) and residue representations for the modular choice of 2, 3 and 5, which are mutually prime. As may be seen in FIG. 1, each column is simply the decimal number modulo the modulus specified at the column heading. Thus, the number 9 is represented by the triplet (1,0,4) where $$|9|_2=1$$

$$|9|_3=0$$

$$|9|_5=4$$

Within the range 2·3·5−1=29 the residue representation provides a one-to-one mapping of the fixed base number.

In analogy with fixed base numbers, fractions in RNS can be represented through use of rescaling and negative numbers are represented by splitting the range into two parts. However, unlike fixed base representation, the explicit notations of a minus sign and a decimal point are not possible due to the non-commensurate, cyclic nature of RNS. The distinction between the number systems in this regard can be exemplified by the existence in RNS of the pseudo-inverses, integers that when multiplied by another integer yield unity. In fact, it is possible in RNS to perform a limited form of exact rational arithmetic, (see reference 11), a feat not possible using fixed base representations.

The importance of RNS to numerical processing is that the operations of addition, subtraction and multiplication can be performed without the use of carry operations. This property is expressed mathematically by the theorems $$\bar{R} \pm \bar{S} = (r_1,r_2,\ldots,r_n) \pm (s_1,s_2,\ldots,s_n) = (|r_1 \pm s_1|_{m1}, |r_1 \pm s_2|_{m2},\ldots, |r_n \pm s_n|_{mn}) \quad (4)$$

and $$\bar{R} \cdot \bar{S} = (r_1,r_2,\ldots,r_n) \cdot (s_1,s_2,\ldots,s_n) = (|r_1 \cdot s_1|_{m1}, |r_2 \cdot s_2|_{m2},\ldots, |r_n \cdot s_n|_{mn}) \quad (5)$$

the proofs for which can be found in reference 9. The implication of these theorems is that each residue in the n-tuple can be operated on independently in parallel. A numerical problem can therefore be broken apart into several small, independent pieces that are devoid of external carry operations, implying the potential for faster performance than systems in which carry operations need to be taken into account.

As a specific example, the three mutually prime moduli 2, 3 and 5 are selected These moduli give a range of representation of 0 through 29 as shown in FIG. 1. In this representation, the decimal numbers 3, n-tuple (1,0,3), and 9, n-tuple (1,0,4), are added and multiplied and compared to the equivalent operations in binary as shown in FIG. 2. From FIG. 2, the parallel nature of RNS arithmetic and the sequential nature of binary arithmetic are evident.

The difficulties associated with actually achieving the goal of faster computation with RNS are the need for the ALU that directly performs modular arithmetic, the need for an efficient division algorithm and the fact that sign and magnitude cannot be shown explicitly. The above-referred copending application Ser. No. 019,761 and U.S. Pat. No. 4,797,043 discuss a suitable ALU in detail and a solution to the second problem of the division algorithm can be found in reference 5. The sign-/magnitude problem may be solved by converting from residue to fixed base representation and using the implicit sign/magnitude information of the latter. Unfortunately, this conversion process is very time consuming due to the need to multiply large fixed base numbers. An alternative is to convert the residue number to a representation known as mixed radix.

As a consequence of equations (4) and (5) one may write the number x in terms of arbitrary weight $w_j$ as follows:

$$x \bmod r = |x|_r = \left|\sum_{j=0}^{n-1} a_j w_j\right|_r \quad (7a)$$

$$= \left|\sum_{j=0}^{n-1} |a_j w_j|_r\right|_r \quad (7b)$$

$$= \left|\sum_{j=0}^{n-1} \left||a_j|_r |w_j|_r\right|_r\right|_r \quad (7c)$$

$$= \left|\sum_{j=0}^{n-1} \left|a_j\right|_r |w_j|_r\right|_r \quad (7d)$$

If the number is given in decimal form, equation 7(c) reads:

$$|x|_r = \left|\sum_{j=0}^{n-1} \left||a_j|_r |10^j|_r\right|_r\right|_r \quad (8)$$

If the number is given in binary form, the formula reads:

$$|x|_r = \left|\sum_{j=0}^{n-1} \left|a_j \mid 2^j \mid_r\right|_r\right|_r \quad (9)$$

where the simplification $$|a_j|_r = a_j \ (10) \quad (10)$$

occurs because the binary digits $a_0$ through $a_{n-1}$ equal 0 or 1, and 0 mod r=0 and 1 mod r=1 for all moduli r.

In binary-coded-decimal notation, each decimal digit $a_j$ is represented by:

$$a_j = \sum_{k=0}^{3} b_{jk} 2^k \quad (11)$$

where each $b_{jk}$ equal 0 or 1. Therefore, the residue of a binary-coded-decimal number is:

$$|x|_r = \left|\sum_{j=0}^{n} \sum_{k=0}^{3} b_{jk} \, |10^j|_r |2^k|_r\right|_r \quad (12)$$

Equation (1) can be generalized by allowing arbitrary weights, $w_i > 1$, instead of powers of a base, i.e., $$x = \sum_{i=0}^{n-1} a_i w_i \quad (13)$$

The mixed radix representation can be related to the residue representation by choosing the weight $$w_i = \prod_{j=1}^{i-1} m_j, \ i \geq 1 \quad (14)$$

and $$w_o = 1$$

It can be shown for this choice of weights that the coefficients are bounded by the related modulus, i.e., $$0 \leq a_i \leq m_i + 1 \quad (15)$$

and that the property $$w_k > \sum_{i=0}^{k-1} a_i w_i \quad (16)$$

will hold. The property in equation (16) also holds for fixed base representation and allows simple determination of sign/magnitude via a digit-by-digit comparison In fact, if $m_n$ is chosen to be 2, then $a_n$ can be used to determine sign in a manner exactly analogous to one's and two's complement in binary.

Figure 3:
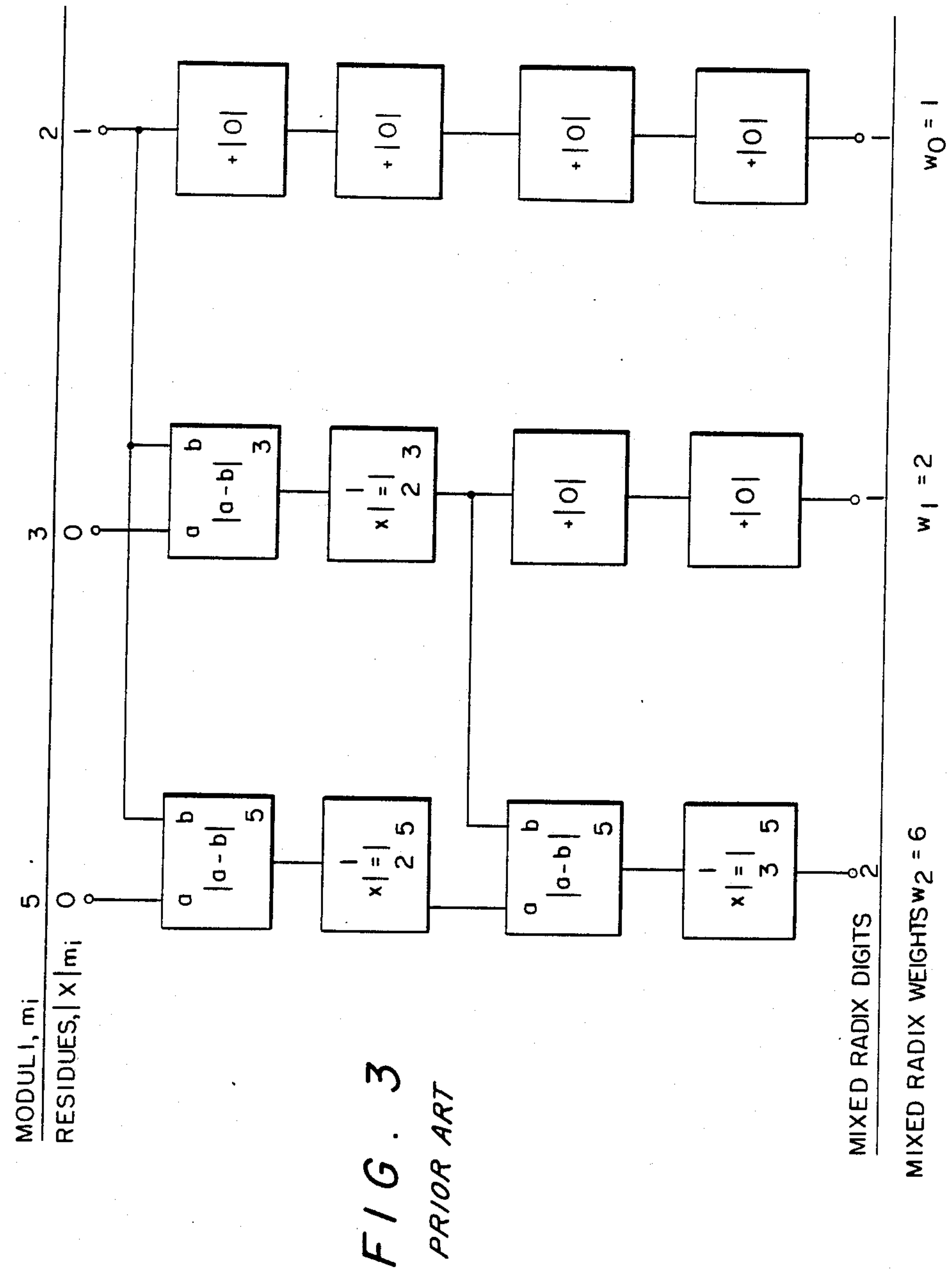
FIG. 3 PRIOR ART
FIG. 3 is a flowchart illustrating the principles of residue-to-mixed radix conversion.

The conversion between residue and mixed radix numbers is performed using a well-known pipelined algorithm (reference 9 ) that sequentially inverts Equations (13) and (14). A flow diagram for the algorithm is shown in FIG. 3 for the case of moduli of 2, 3, 5. The double bar symbol in FIG. 3 indicates a pseudo-inverse multiplication operation and the plus zero indicates a matched delay. As can be seen, the algorithm requires the use of RNS adders, RNS multipliers that multiply b the pseudoinverse of a modulus and fixed delays for an actual hardware implementation. In the general case of n moduli, the algorithm requires 2(n−1) steps, which although not large, is often considered to be excessive when compared to fixed base magnitude comparison.

The number of actual operations needed to perform the algorithm in FIG. 3 can be less than 2(n−1), depending on the form of representing the individual residues. The usual choice is to use a fixed base notation, e.g., binary to encode the individual residues. (See reference 10.) For this choice, an active device must be used for each add and multiply in the algorithm. Binary lookup tables or small binary adders are often used, with the latter able to perform the multiplication if prime moduli have been chosen (reference 10). A positional notation can also be used with $m_i$ lines for each moduli and each line representing one of the possible residue values In this notation only one line is turned on at a time to indicate the data value. It has been shown that use of positional notation reduces multiplication by a known constant to a fixed mapping between the input and output states (reference 1). Thus, the algorithm in FIG. 3 only requires n−1 additions to perform when positional notation is used. As most implementations of RNS processing will typically require only 3 to 5 moduli, then 2 to 4 operations will be all that is required to obtain sign/magnitude information.

The importance of rapid conversion from residue to mixed radix representations extends beyond sign/magnitude comparison. As outlined in Szabo and Tanaka (reference 9 ) and Taylor (reference 10), this conversion is central to important computer processes such as overflow detection and rescaling in RNS.

III. System Configuration

Figure 4:
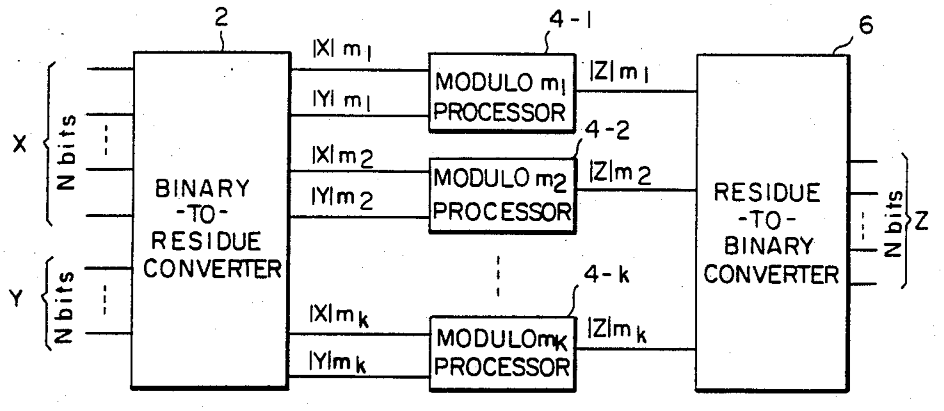
FIG. 4 is a general block diagram for a general form of a pipelined residue number system processor.

A generalized configuration for a special purpose processor utilizing the principles of the invention is shown in FIG. 4. As seen in FIG. 4, two binary numbers X and Y are provided as inputs to a binary to residue converter 2 which is optically connected to a plurality of modulo m processors 4-1, 4-2 . . . 4-k. The modulo m processors 4 are in turn connected to a residue to binary converter 6 which provides a binary output to downstream apparatus. The input binary bits are typically presented in electrical form and the binary-to-residue converter includes means for converting the electrical signals into optical signals as more fully described below. In the binary optical representation, only two lines are needed for each digit, and activation of one of these lines would correspond to the digit coefficient being either one or zero. The residue-to-binary converter may also include means for converting the optical binary format into electrical binary signals. Each modulo m processor 4-1, 4-2 . . . 4-k receives the residue numbers corresponding to its own modulus These processors may consist of a plurality of adders, subtractors, and multipliers configured to perform a specific function. Each modulo m processor 4-1, 4-2 . . . 4-k operates in parallel and operates independently of the other processors. Processing may be done at a throughput rate given by the number of input its per ALU cycle time. The cycle time may simply be a single clock cycle resulting in a very fast architectural structure.

Figure 5:
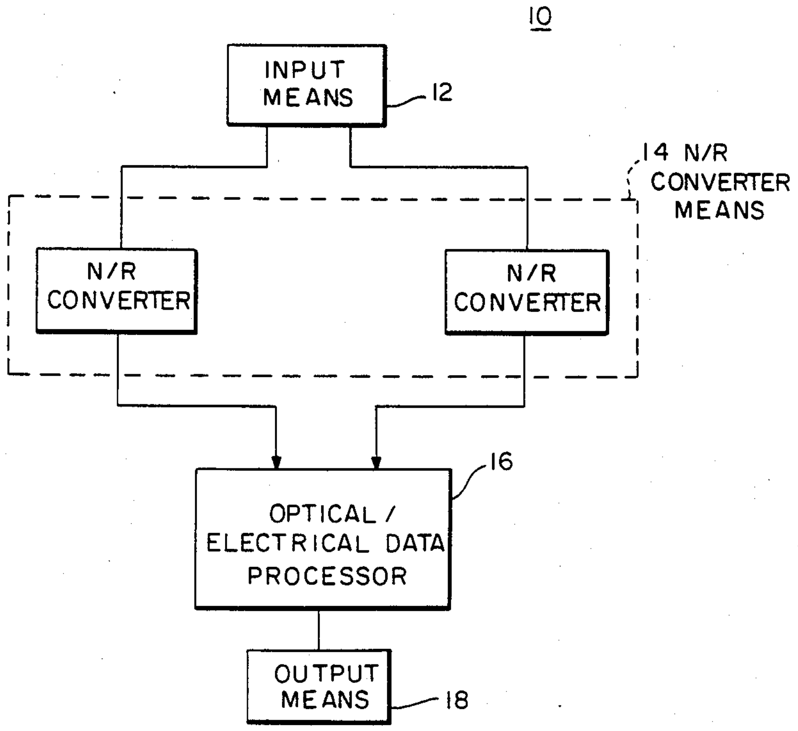
FIG. 5 is a block diagram of a hybrid optical/electrical data processor.

FIG. 5 sets forth an overall block diagram of a more general purpose optical/electrical data processing apparatus which includes both optical and electrical data processing components. As seen in FIG. 5, the optical computing apparatus comprises an input means 12, number/residue (N/R) converter means 14, optical/electrical data processor 16 and output means 18. Within the number/residue converter means may be included a plurality of individual number/residue converters, only two of which are illustrated.

Figure 6:
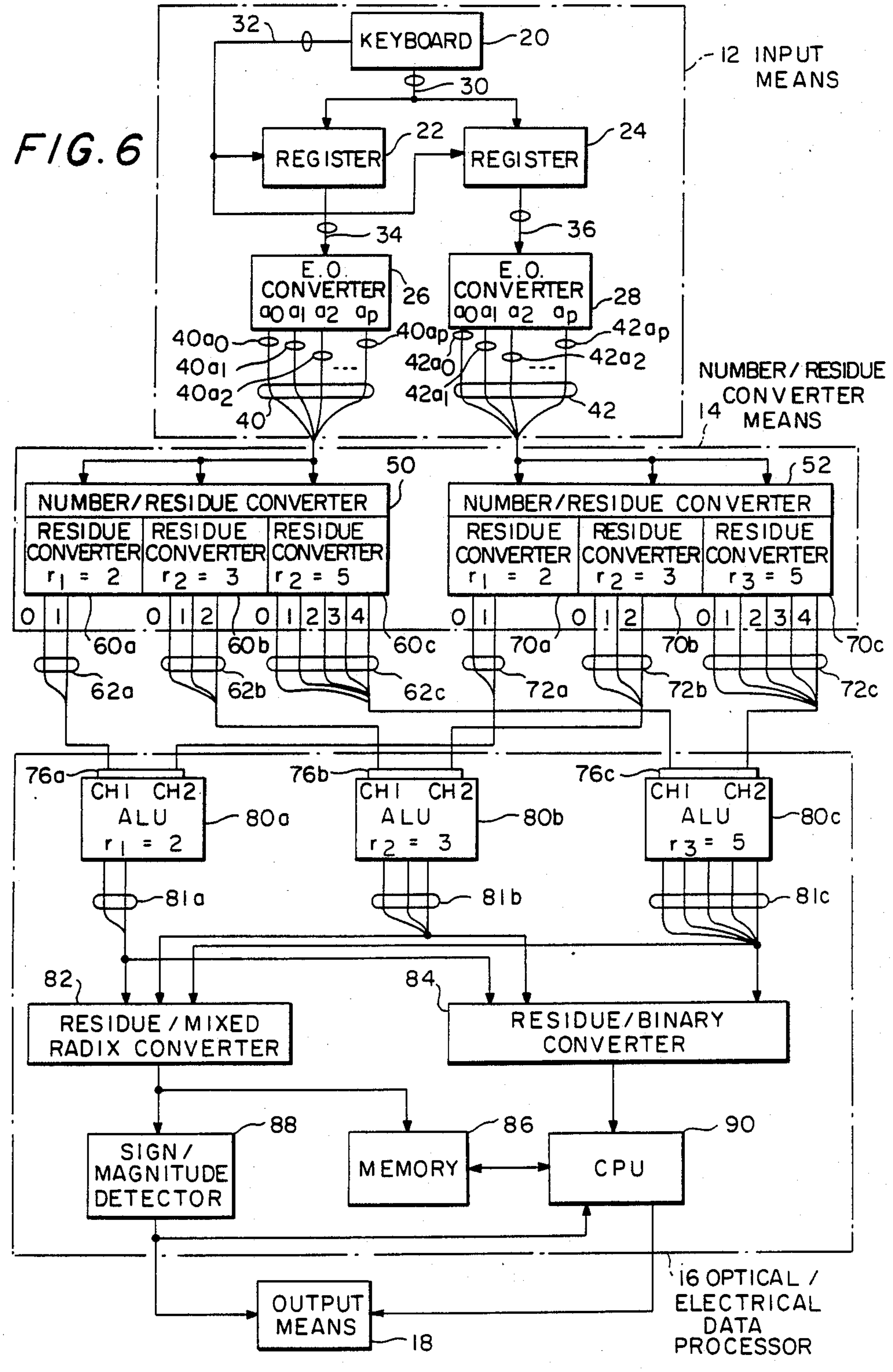
FIG. 6 is a more detailed block diagram of the hybrid optical/electrical data processor of FIG. 5.

A more detailed block diagram of FIG. 5 is set forth in FIG. 6. Input means 12 is seen to comprise a keyboard 20, registers 22 and 24, and electro-optical (EO) converters 26 and 28. Keyboard 20 is interconnetted to the registers 22 and 24 via data lines 30 for storing binary or BCD coded electrical signals corresponding to first and second numbers in registers 22 and 24, respectively. Loading of the electrical signals corresponding to the first and second numbers into the separate registers is controlled by means of a first control signal on control lines 32. A second control signal on control lines 32 simultaneously reads out the contents of registers 22 and 24 into the respective EO cnnverters 26 and 28 via the data lines 34 and 36, respectively. The EO converters 26 and 28 convert the electrical signals received from the respective registers 22 and 24 into an optical one-of-many representation and pass the generated light along the numeric light transmitting paths 40 and 42. Each of the numeric light transmitting paths 40 and 42 consist of a plurality of groups of light transmitting paths, one group for each integer coefficient $a_i$ corresponding to the expansion of equation (1) or equation (13). In the general use, the EO converters may supply a one-of-many digit representation for any base, and both binary (base 2) and decimal (base 10) will be considered by way of example.

As a first example in decimal notation, the decimal number 2136 has the following coefficients:

$a_0=6$ $a_1=3$ $a_2=1$ $a_3=2.$

For each coefficient, a, a group of ten separate optical paths are provided corresponding to one of the possible choices for a base ten number, namely, 0, 1, 2 . . . 9. Ten light transmitting paths form a group 40$a_0$, corresponding to coefficient $a_0$; ten additional light transmitting paths form a group 40$a_1$ corresponding to coefficient al; ten further light transmitting paths form a group 40$a_2$ corresponding to coefficient $a_2$; etc., where $a_0$, $a_1$, $a_2$ $a_p$ correspond to the coefficients of the number stored in register 22. The maximum coefficient $a_p$ corresponds to the maximum number of digits which can be stored in the register 22 or 24. Similarly, the light transmitting paths 42 of the electro-optical converter 28 actually consists of a plurality of groups of light transmitting paths, group 42$a_0$(ten separate paths) corresponding to coefficient $a_O$. group 42$a_1$ (ten separate paths) corresponding to coefficient $a_1$ and group 42$a_p$ (ten separate paths) corresponding to coefficient $a_p$ where $a_0$, $a_i$, . . . $a_p$ are the coefficients corresponding to the numbers stored in register 24.

Conventional keyboard circuitry typically provides either binary or BCD signals for storage in registers 22 or 24. For binary storage a suitable EO converter may be fabricated from an electro-optical X-switch as described by A. Neyer in *Electronics Letters,* Vol. 19, No. 14, p. 553–554, July 1983 and explained more fully below. For keyboard electronics which provides electrical signal representations in BCD format, the electro-optical converters 26 and 28 may take the form of conventional line drivers for converting to a one-of-many representation on the output light transmitting paths 40 and 42. Each line driver output may, for example, be coupled to an LED for generating a light signal on the selected line. For example, the first four digits of a BCD representation corresponds to the decimal coefficient $a_0$ and a line driver is provided for converting these first four BCD digits into one of ten output lines (assuming base 10 is desired) corresponding to the decimal digits 0, 1, 2 . . . 9 on the light transmitting group $40a_0$. Similarly, the second group of four BCD digits is converted by another line driver to drive one of the ten lines of the light transmitting group $40a_1$. In this manner, each BCD number represented in the registers 22 and 24 is converted into a one-of-many representation for the decimal digits appearing on the light transmitting paths 40 and 42.

The light transmitting paths 40 and 42 are connected to respective number/residue converters 50 and 52 which form the number/residue converter means 14. Number/residue converter 50 is seen to comprise a plurality of residue converters 60*a*, 60*b* and 60*c*. Generally, there may be any number of residue converters from one to any finite number corresponding to moduli from one to any finite prime number where the selected moduli are mutually prime. In the illustrated embodiment, the mutually prim moduli 2, 3, and 5 are utilized by way of example only, and not by way of limitation. The register converter 60*a* converts all digits of the number into the residue representation modulo 2; the residue converter 60*b* converts all digits into the residue representation modulo 3; and the residue converter 60*c* converts all digits into the residue representation modulo 5.

Similarly, the number/residue converter 52 is composed of three separate residue converters 70*a*, 70*b* and 70*c* corresponding to the radices 2, 3 and 5, respectively. The residue 2 converters 60*a* and 70*a* provide outputs along their respective output lines 62*a* and 72*a*; the residue 3 converters 60*b* and 70*b* provide outputs on their respective output lines 62*b* and 72*b*; and the residue 5 converters 60*c* and 70*c* provide outputs on their respective output lines 62*c* and 72*c*.

It is understood that while only two number/residue converters 50 and 52 are illustrated, the invention may also be practiced with more than two such converters, 111 of which would most preferably, but not necessarily, be operable in parallel. In this connection, input means 12 may also be implemented to supply the requisite light beams in parallel to all of the number/residue counters.

All of the outputs of the number/residue converter means 14 are fed to the optical/electrical data processors 16. The optical/electrical data processor 16 is seen to comprise optical interfaces 76*a*, 76*b* and 76*c*, arithmetic/logic units (ALU) 80*a*, 80*b* and 80*c*, a residue/-mixed-radix converter 82, residue/binary converter 84, memory 86, sign/magnitude detector 88 and CPU 90. The output of the CPU 90 and sign/magnitude detector 88 may be connected to output means 18. The outputs of the ALU's 80*a*, 80*b* and 80*c* are fed as inputs to the residue/binary converter 84 via one-of-many communication paths 81*a*, 81*b* and 81*c*, respectively. These communication paths may be either electrical or light transmitting depending on the selected form of the ALU output as explained further below. Optical interfaces 76*a*–76*c* ensure than the one-of-many optical light transmitting paths, serving as inputs to the ALU's, are properly spaced relative to one another. This is important in fabricating a Fourier transform or pattern recognition type of ALU to be described more full below in connection with FIGS. 28–32.

ALU 80*a*is a modulo 2 arithmetic logic unit; ALU 80*b* is a modulo 3 arithmetic/logic unit; and ALU 80*c* is a modulo 5 arithmetic/logic unit. The outputs of the residue 2 converters, namely, residue converters 60*a* and 70*a* are fed to the ALU 80*a*; the outputs of residue converters 60*b* and 70*b* are fed to ALU 80*b* and the outputs of residue converters 60*c* and 70*c* are fed to ALU 80*c*. Each of the ALU's 80*a*, 80*b* and 80*c* performs an arithmetic or logic operation modulo the respective modulus 2, 3 and 5, respectively. Each of these ALU's may be composed of apparatus as described in copending application Ser. No. 019,761 and U.S. Pat. No. 4,797,843 incorporated herein by reference. After performing the designated operation, for example, one or more of the steps of multiplication, addition, or subtraction, the residue representation is then converted into binary by means of the residue/binary converter 84 where a binary electrical signal is fed to CPU 90. Conventional electronic processing may then be performed with CPU 90 and memory 86 utilizing the results of the parallel pipeline processing performed by the ALU's 80*a*, 80*b* and 80*c*. CPU 90 may then provide an output signal to output means 18 which may itself comprise a display or controlled device.

In general terms, the optical/electrical data processor 16 is composed of an optical computer (element 80*a*, 80*b* and 80*c*) as well as an electronic computer (elements 90 and 86). Although only one stage of optical processing is illustrated, it is understood that additional ALU's may be connected in series with each of the first stage ALU's (e.g., elements 80*a*, 80*b* to 80*c*) to form multiple logic and/or arithmetic stages. Although not required, it is most preferable that data is processed in parallel by the ALU's in each stage with the entire optical computer operable as a pipeline processor.

In relation to FIG. 6, it may be understood that the aggregate of the numeric light transmitting paths 40 (with or without light transmitting paths 42) may be considered a first plurality of light transmitting paths, and the aggregate of residue light transmitting paths 62*a*, 62*b* and 62*c* (with or without residue light transmitting paths 72*a*, 72*b* and 72*c*) may be considered a second plurality of light transmitting paths. Among the second plurality of light transmitting paths, the plural outputs of each residue converter (e.g., 60*a*) may be considered a positionally encoded subgroup of the second plurality of light transmitting paths. By selecting among the first plurality of light transmitting paths, 40, a number (in a one-of-many representation) may be represented by first light beams in which one light path is illuminated for each group $40a_0$, $40a_1$ $40a_p$. After the conversion process of the number/residue converter 50, second light beams are generated among the second plurality of light transmitting paths 62*a* 62*b* and 62*c*. These second light beams form an ordered group in the sense that they are generated in an ordered relationship corresponding to the outputs of the individual radix converters 60*a*, 60*b* and 60*c*. Each of the second light beams is representative of the residue of the number input into the residue converter (e.g., 60*a*) modulo the given modulus of the residue converter (e.g., modulo 2 for residue converter 60*a*).

Each subgroup of the second plurality of light transmitting paths (e.g., paths 62*a*), is itself positionally encoded in that a separate dedicated output light path is provided for each possible output of the residue converter, and the illuminated path (i.e., one of the second light beams) thus forms a spatial light pattern representative of the value of the respective residue. This spatial light pattern is particularly important in performing calculations using downstream ALU's of the Fourier transform type described below and is also important in providing a proper selection of inputs for the cross bar implementation of the optical ALU's also described below.

It may also be understood in relation to FIG. 6 that EO converter 26 generates first light beams corresponding to a first number (stored in register 22) and EO converter 28 generates additional first light beams corresponding to a second number (stored in register 24). In this case, number/residue converter 50 generates a first ordered group of second light beams corresponding to the first number, and number/residue converter 52 generates a second ordered group of second light beams corresponding to the second number.

Figure 7:
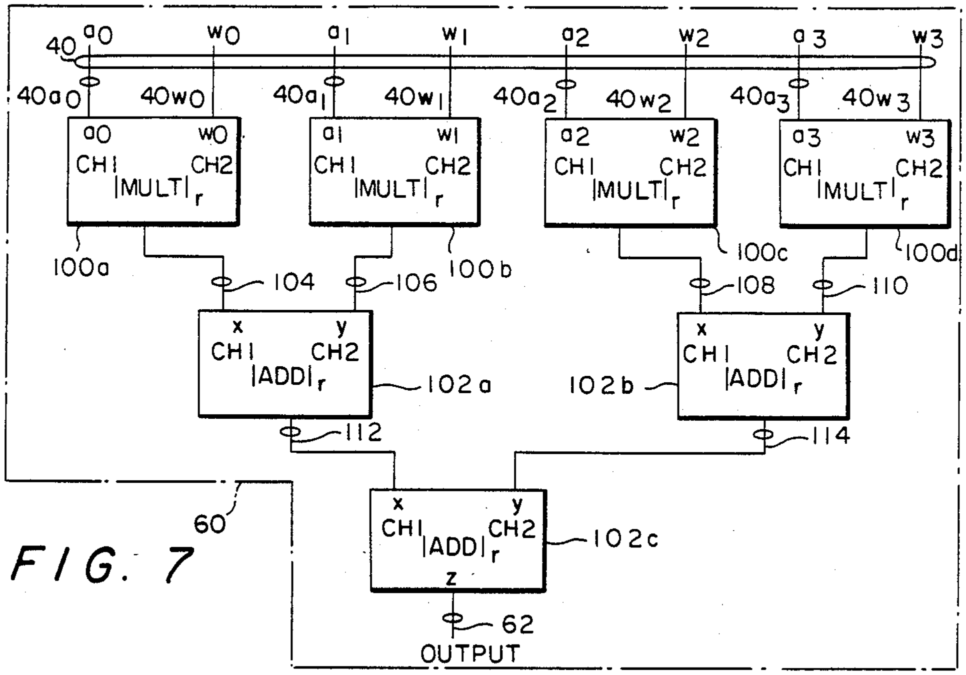
FIG. 7 is a block diagram of a first embodiment of a residue converter.

FIG. 7 illustrates a block diagram of a particular one of the residue converters 60*a*-60*c* or 70*a*-70*c* which form the number/residue converter means 14. The residue converter shown in FIG. 7 is designated by the number 60 and is a more generalized version of the digit/register converter illustrate in FIG. 6 in that each coefficient $a_i$ also has a separate weight line corresponding to weight $w_i$ associated therewith. For this more generalized case, the output of the electro-optical converter 26 includes a signal along a separate weight line for each of the weights $w_{i,}$ $_i$=0, 1, . . . P. As shown in FIG. 7, weight line 40*w*$_0$ is associated with the group 40*a*$_0$ corresponding to coefficient $a_0$; weight line 40*w*$_1$ is associated with the group 40*al* corresponding to the coefficient $a_1$, etc.

The residue converter 60 shown in FIG. 7 implements the number/residue conversion as expressed in equations 7*a*-7*d*. Residue converter 60 is seen to comprise multipliers 100*a*, 100*b* , 100*c* and 100*d* together with adders 122*a*, 102*b* and 102*c* interconnected as illustrated. Multiplier 100*a* multiplies the weight $w_0$ with the coefficient $a_0$ and feeds the result of the multiplication along a plurality of lines 104 to the adder 102*a*. Multiplier 100*b* multiplies the coefficient al by its weight $w_1$ and feeds the product along the plural output lines 106 to the adder 102*a*. Similarly, multipliers 100*c* and 100*d* feed their respective outputs along lines 108 and 110 to the adder 102*b*. Each adder 102*a* and 102*b* in turn adds the inputs thereto and feeds the results along lines 112 and 114 to the adder 102*c* where the output is provided along a line 62. Line 62 corresponds to one of the lines 62*a*, 62*b* and 62*c* in FIG. 6. It is noted in relation to FIG. 7 that the number of lines included within the group 104, 106, 108, 110, 112, 114 and 62 depends upon the radix value. For the general modulus r, the number of lines is simply r.

In the generalized case, a separate residue converter 60 would exist for each of the residue converters 60*a*, 60*b*, 60*c*, 70*a*, 70 and 70*c* shown in FIG. 6. Further, each modular multiplier and modular adder of FIG. 7 may be considered as having light receiving input and light transmitting outputs even though such inputs or outputs may be simply couplings to or continuations of light transmitting paths. In the general case, the modular multipliers may be thought of as including a third plurality of light transmitting paths connecting the multiplier inputs to the multiplier outputs. The modular adders may then be considered as generating the ordered group of second light beams from among the second plurality of light transmitting paths.

Figure 8:
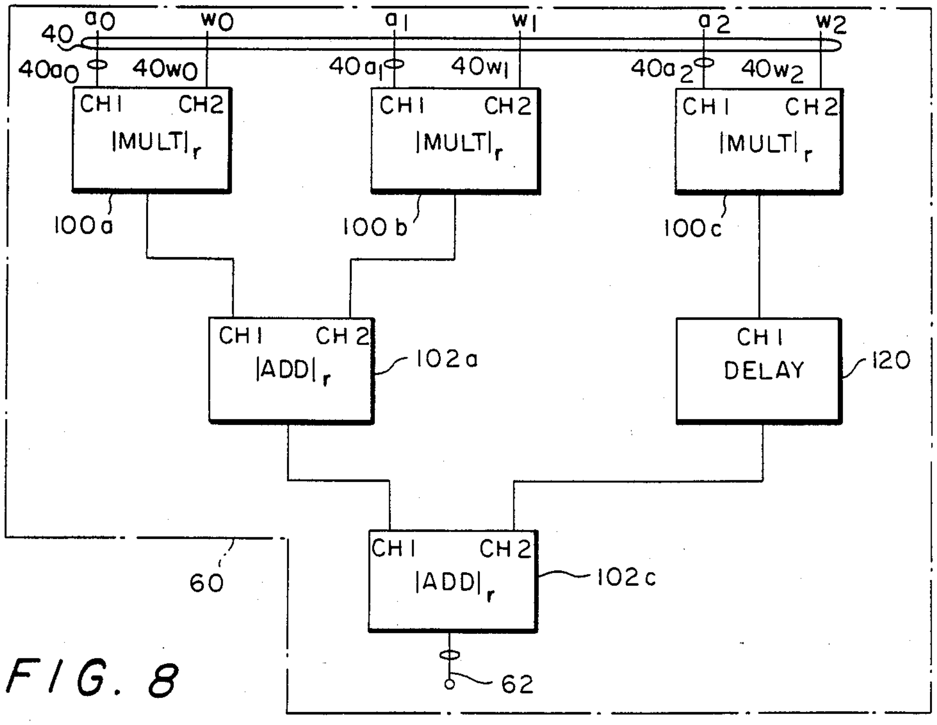
FIG. 8 is a block diagram of a second embodiment of a residue converter.

FIG. 8 illustrates an alternate embodiment of FIG. 7 wherein only a three digit number is employed. The principles illustrated in FIG. 8 would also apply to any odd number digit being processed. The basic difference between FIG. 7 and FIG. 8 is the utilization of a delay 120 at the output of multiplier 100*c*. The purpose of the delay 120 is to ensure synchronization of a parallel pipeline processing of data at each stage within the residue converter 60. The delay 120 may be fabricated from lengths of fiber optics.

Figure 9:
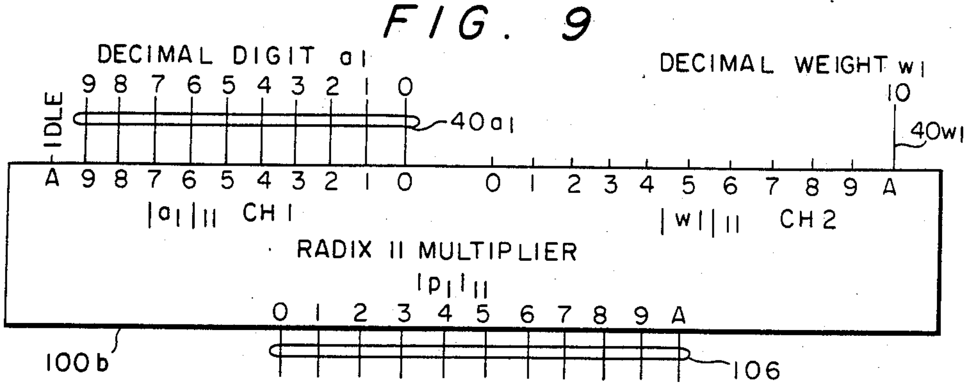
FIG. 9 is a block diagram of a first embodiment of a multiplier utilized in the residue converter of FIG. 7.

FIG. 9 is a block diagram showing more particular details of the multiplier 100*b* of FIG. 7. The lines forming the group 40*al* and the weight line 40*w*$_1$ are fed as inputs to the multiplier 100*b*. For purposes of illustration, it is assumed in FIG. 9 that the modulus has a value of 11 and that one is converting from a decimal notation for the decimal digit $a_1$ to residue representation modulo 11. In this case, the weight $w_1$ is fed to the A terminal input of tee multiplier (corresponding to a weight of 10 modulo 11) and the optical signals for decimal signals corresponding to 0, 1, 2, . . . 9 of the input light group 40*al* are connected to terminals 0, 1, 2 . . . 9 of the multiplier 100*b*. As taught in the above referenced copending application Ser. No. 019,761 and U.S. Pat. No. 4,797,843, the multiplier 100*b* multiplies the two inputs $a_1$ and $w_1$ in accordance with equation 7*c* and provides the output modulo 11 along one of the output lines in the group 106.

Figure 10:
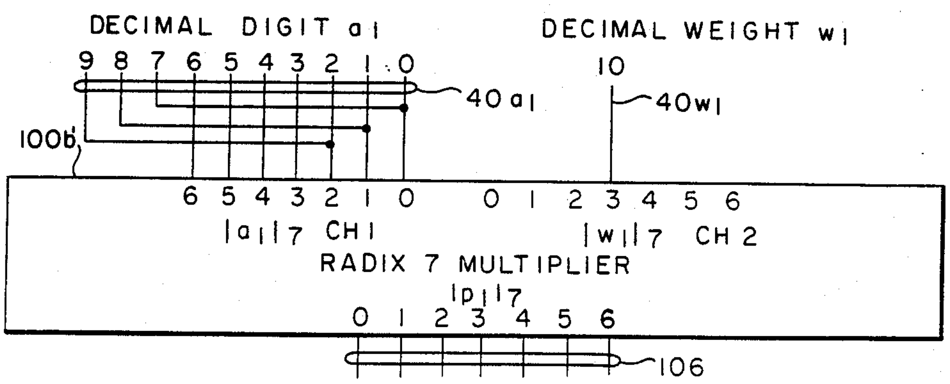
FIG. 10 is a block diagram of a second embodiment of a multiplier utilized in the residue converter of FIG. 7.

FIG. 9 is applicable for any multiplier 100*b* wherein the base of the digit (for example, 10) is not larger than the modulus r. FIG. 10 illustrates the case in which the base of the digit exceeds the modulus r. In FIG. 10, multiplier 100*b*', is illustrated for the case in which the modulus is 7 and the decimal digit $a_1$ with its weight $w_1$ are fed as inputs thereto. In this case the computation of $a_1$ modulo 7 for decimal digits greater than 6 (e.g., r−1), may be done mechanically via connecting the digit lines in cyclic rotation to the inputs of the multiplier 100*b*', Cyclic connection schemes via optical holographic filters have been demonstrated in reference 12 and may be used if desired.

It is noted in FIG. 10 that the weight $w_1$ along the input line 40*w*$_1$ is fed to terminal 3 of the multiplier 100*b*, Terminal 3 corresponds to the residue of the weight $w_1$=10 modulo 7=3.

Figure 11:
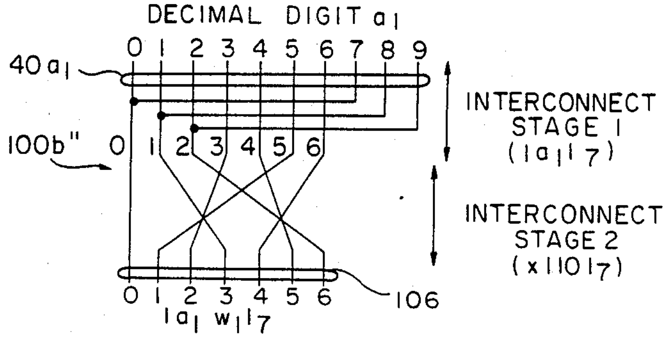
FIG. 11 is a block diagram of a third embodiment of a multiplier utilized in the residue converter of FIG. 7.
Figure 12:
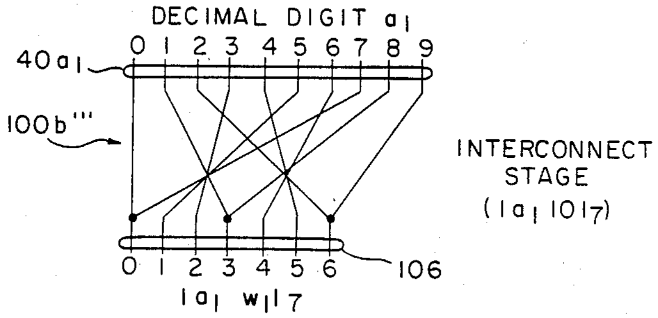
FIG. 12 is a fourth embodiment of a multiplier utilized in the residue converter of FIG. 7.

Since the weights $w_j$ are fixed numbers, it is always possible to replace the multiplier stages associated with these fixed weights (egg., FIGS. 9 and 10) with a fixed interconnection pattern. There are basically two forms for such an interconnection pattern. The first form is illustrated in FIG. 11 wherein the output of the interconnection pattern that forms $a_j$ modulo r is used as the input to a second interconnection pattern which produces the product $a_j \times w_j$ modulo r. FIG. 11 basically corresponds to FIG. 10 where the multiplication by the weight $w_1$ is achieved by the fixed interconnection pattern to provide the output along lines 106. The second possible interconnection pattern is illustrated in FIG. 12 wherein the product for all possible values of $a_j$ is computed in the design stage of a single stage interconnection to produce the same output result along the lines 106. In this case, multiplier 100*b*''' replaces the multiplier 100*b*', of FIG. 10. It is expected that the single stage interconnection as shown in FIG. 12 will achieve the fastest results.

Either the single stage interconnection of FIG. 12 or the two stage interconnection of FIG. 11 may readily be employed as the multiplier 100*b* of FIG. 7. The fabrication of corresponding interconnection patterns for the multipliers 100*a*, 100*c* and 100*d* of FIG. 7 are readily apparent. Further, the utilization of the fixed interconnection patterns o FIGS. 11 and 12 make it clear that the number/residue converters 50 and 52 of FIG. 6 need only receive the coefficient values $a_0$, $a_1 \ldots a_p$ without explicitly receiving the weights since the fixed weights themselves may be replaced by the fixed interconnection patterns such as those shown in FIGS. 11 and 12.

Figure 13A:
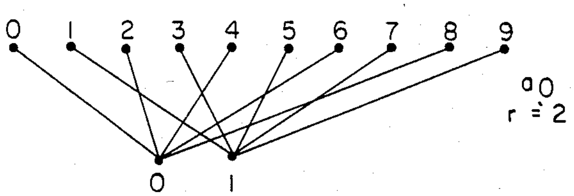
FIGS. 13A–13F represent input/output interconnections for multipliers having different moduli.
Figure 13B:
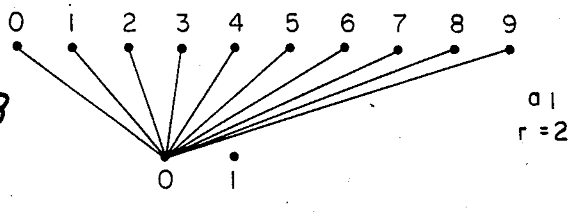
Figure 13C:
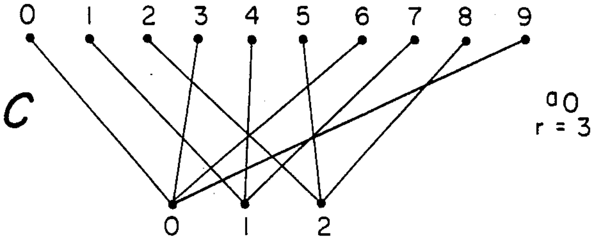
Figure 13D:
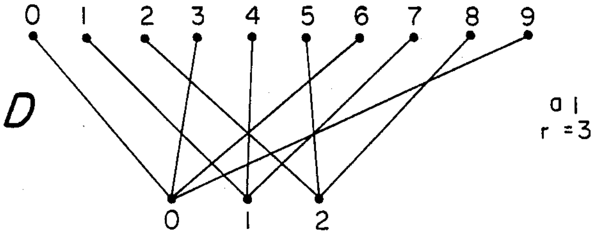
Figure 13E:
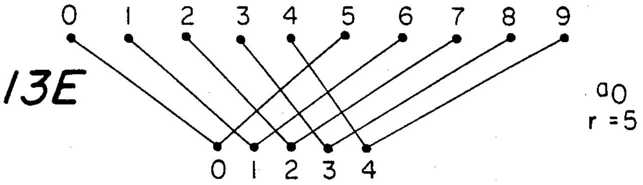
Figure 13F:
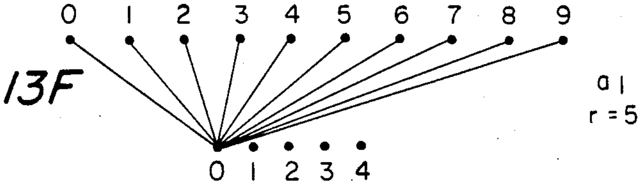

In implementing the decimal number to residue representation conversion, a simplification appears with regard to the moduli 2 and . These prime moduli are both factors of 10 and thus only the lowest order product $a_o w_o = a_o$, has a non-zero residue. The higher order digits can simply be all interconnected to the zero residue. FIG. 13A illustrates the residue for the coefficient $a_0$ for the case with r=2 whereas FIG. 13B represents the case for the coefficient $a_1$ for the same modulus. All higher order coefficients, namely, $a_2$, $a_3$, etc., follow exactly the interconnection scheme of FIG. 13B having only zero residues. The modulo 5 case is illustrated in FIG. 13E and 13F. In FIG. 13E, the lowest order coefficients $a_0$ are mapped to both zero and non-zero residues whereas for the coefficient al and higher order coefficients ($a_2$, $a_3$ etc.) the residues all map to zero as shown in FIG. 13F. FIGS. 13C and 13D illustrate the first two coefficients for the modulus 3 decimal to residue interconnect scheme. Although no simplification occurs as in the case of moduli 2 and 5, the interconnection scheme for higher order coefficients can be readily determined from the respective residues.

Binary to Residue Conversion

The most immediately applicable interface between the optical computer of the present invention and a conventional electrical data processor makes use of conversion of electrical binary signals into a residue representation. The overall block diagram illustrated in FIG. 6 is still applicable, but in this situation the EO converters 26 and 28 are replaced by simple binary light switches as discussed more fully below. The electro-optical converters 26 and 28 again provide light transmitting paths 40 and 42 which are connected to the number/residue converter means 14. In this case, however, each of the groups 40*a*$_0$, 40*a*$_1$ . . . 40*a*$_p$, 42*a*$_0$, 42*a*$_1$ . . . 42*a*p, include only two separate light transmitting paths, one for each possible residue state of the conversion process (0 and 1).

Figure 14:
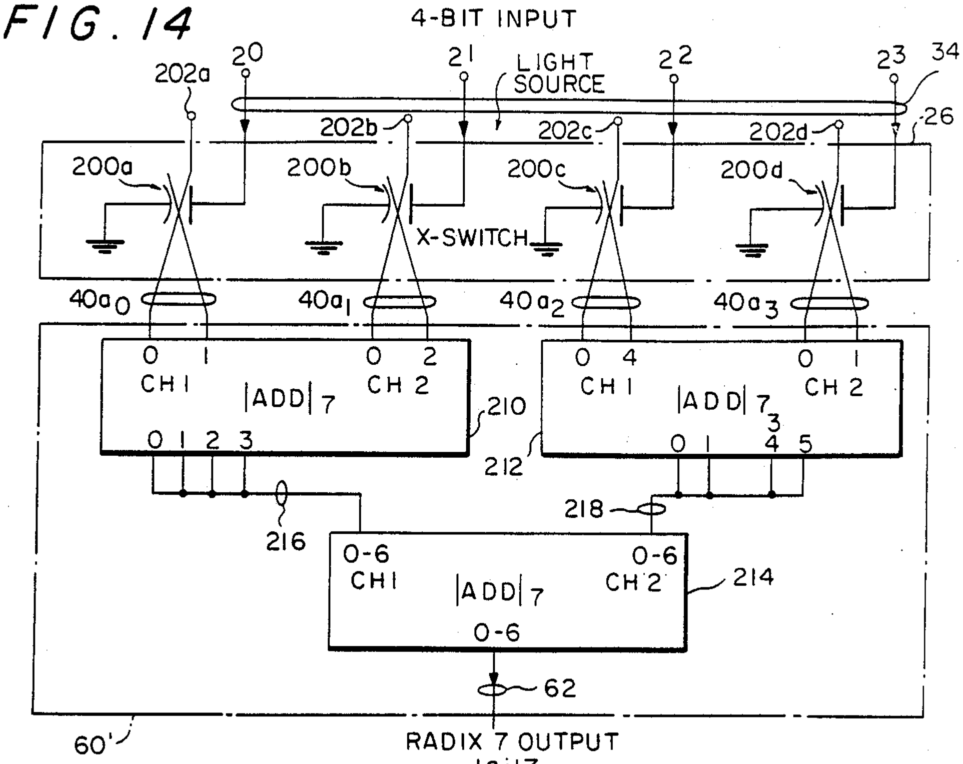
FIG. 14 is a first embodiment of an electro-optical converter and residue converter of FIG. 6.

FIG. 14 illustrates one of the electro-optical converters, for example converter 26, together with one of the residue converters 60 forming part of the numeric/residue converter 50. In FIG. 14, the residue converter is identified by the number 60' and is illustrated in reference to a radix 7 to provide a more generalized teaching As illustrated in FIG. 14, the electro-optical converter 26 is seen to comprise a plurality of light switches 200*a*, 200*b*, 200*c* and 200*d* corresponding to the coefficients $a_0$, al, $a_2$and $a_3$. Each light switch 200*a*, 200*b*, 200*c*, 200*d* is associated with a corresponding light source 202*a*, 202*b*, 202*c* and 202*d*. Electrical binary input signals on data lines 34 (from register 22 of FIG. 6) are fed either as binary one or zero signals (signal in one of two voltage states or levels) to the corresponding light switch 202*a*–202*d*. Depending upon the level of the binary signal, the light switch provides an output on either one of two output paths. These two paths form the groups 40*a*$_0$, 40*a*$_1$, 40*a*$_2$ and 40*a*$_3$. Suitable light switches are described by A. Neyer in "Electro-Optic X-Switch Using Single-Mode Ti:$LiNbO_3$ Channel Waveguides", *Electronics Letters*, Vol. 19, No. 14, July 7, 1983, pages 553–554. The residue converter 60' shown in FIG. 14 is seen to comprise adders 210, 212 and 214. The output of adder 210 is fed to adder 214 along optical transmitting paths 216, and the output of adder 212 is fed to adder 214 along light transmitting paths 218.

It may be seen that the output of light switch 200*a* is fed to a first channel input of the adder 210 and connected to terminals 0 and 1 thereof. The output of light switch 200*b* is fed to a second channel input of adder 210 and is connected to the input terminals 0 and 2 thereof. These connections are made inasmuch as the light switch 200*a* represents either the unit values 0 or 1 (e.g., $a_o \cdot 2^0$) whereas the light switch 200*b* provides an output representative either a 0 or 2 (corresponding to the product $a_1 \cdot 2^1$). In a similar manner, the output of light switch 200*c* is fed to the first channel input of adder 212 and connected to the input terminals 0 and 4 thereof. Finally, the light switch 200*d* is fed to the second channel input of adder 212 and is connected either the 0 or 1 input terminals thereof The connection to the 1 input terminal is made inasmuch as the product $a_3 \cdot 2^3$ may take on the values 0 or 8, but 8 modulo 7 is 1 so that the only two possible inputs to the second channel of adder 212 are 0 and 1.

The outputs of adder 210 along the light transmitting paths 216 may take on values 0, 1, 2 or 3 depending upon the results of the addition. The outputs of the adder 212 along the light transmitting paths 218 may take on only the possible values 0, 1, 4 and 5 as is evident from the input choices of 0, 4 for channel 1 and 0, 1 for channel 2. The adder 214 supplies one of seven possible output values along one of the seven possible output lines 62.

It is noted in reference to FIG. 14 that the electrical signals input along the data lines 34 may either correspond to a zero bit or a one bit with the weight itself represented by the particular data line being activated. In this manner since the weights are fixed, the output of the light switches 200*a*–200*d* may be connected in a fixed pattern to inputs of the residue converter to represent the multiplication of the weight by its particular coefficient For example, coefficient $a_2$ multiplied by its associated weight may take only one of two possible values, namely, 0 or 4 as illustrated by the first channel input to adder 212.

It is also noted in relation to FIG. 14 that the adder 210 has only four distinct outputs, 0, 1, 2 and 3. Thus, the optical arithmetic logic unit utilized to implement the adder 210 needs only to be fabricated using a modulus which is the lesser of 4 and r (in this case r=7). One may utilize the notation "min (r, 4)" to designate the minimum value of the numbers in parentheses. By similar reasoning, the adder 212 may also be built to use a modulus of min (4, r). he adders 210 and 212 may be thought of as first stage adders inasmuch as they directly receive the output of the electro-optical converters. Adder 214 is a second stage adder and ma be fabricated utilizing a modulus of min (r, 16). By similar reasoning, any needed third stage adder (for a 16-bit input or the like) would utilize optical arithmetic logic units of modulus of min (r, 256). Residues for the radix 2 constitute a very special case. Only the lowest order bit (the "1" bit) has a non-zero residue in modulus 2. In this case only, the hardware apparatus downstream of the light transmitting switch ned only contain delay stages to ensure synchronism with stages of data conversion.

Optical BCD to Residue Conversion

There are basically three separate methods which may be utilized in converting the optical binary coded decimal (BCD) to residue representation The first method utilizes the circuitry as shown in FIG. 14 to implement equation (11) for each coefficient $a_j$. Multiplication by the base $10^j$ in accordance with equation (12) is then performed in a similar manner as illustrated in FIG. 7, preferably taking advantage of the fixed interconnect schemes (made possible by virtue of the fixed weights) as shown in FIGS. 11 and 12. In this connection it is noted that FIG. 14 is applicable for each coefficient $a_j$ of the BCD number since each coefficient is represented by four its having weights 1, 2, 4 and 8 as per equation (11).

A second method of converting the optical binary coded decimal into residue representation, is achieved by recasting equation (12) as follows:

$$|N|_r = \left| \sum_{j=0}^{n} \sum_{k=0}^{3} b_{jk} \, |10^j 2^k|_r \right|_r \quad (17)$$

Figure 15:
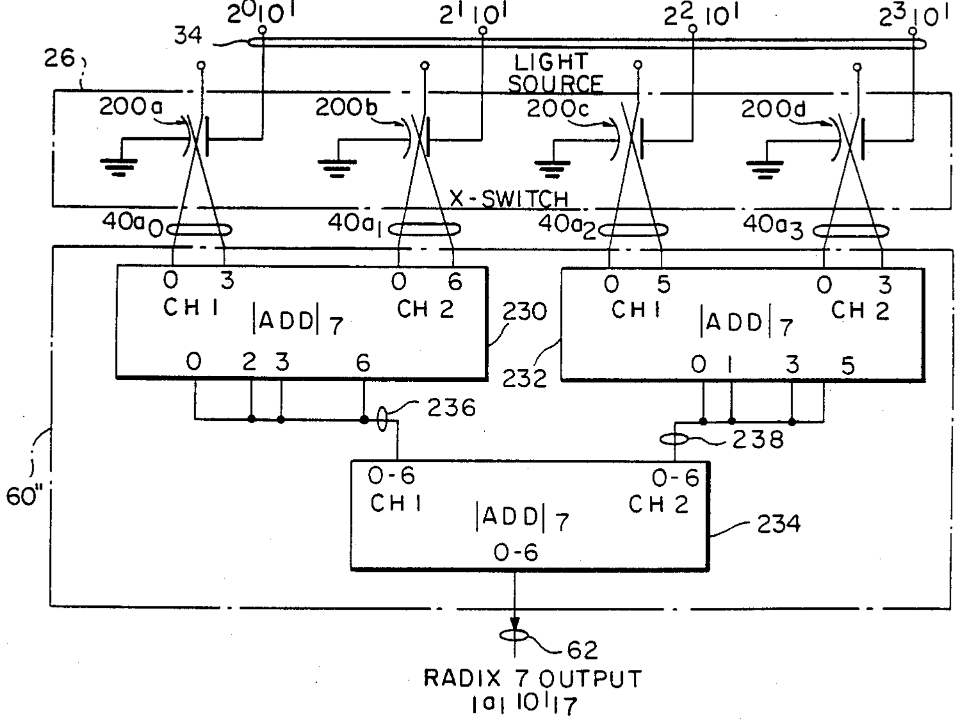
FIG. 15 is a second embodiment of an electro-optical converter and residue converter of FIG. 6.

As may be seen from equation (17), the value $10^j \cdot 2^k$ may be computed in the design stage to find an especially simple input interconnection pattern for computing $a_j$ $10^j$ mod r directly from the input bits. FIG. 15 illustrates this second method using the tens bits as an example. As in FIG. 14, the electro-optical converter includes the plurality of light switches 200*a*–200*d*, with each light switch providing one of two outputs. The residue converter is now identified by the number 60″ and is seen to comprise adders 230, 232 and 234 with the output of adder 230 interconnected to adder 232 via light transmitting paths 236 and the output of adder 232 interconnected to adder 234 via the light transmitting paths 238. The inputs provide in FIG. 15 correspond to summation over k with the value of j set at one. Thus, the apparatus shown in FIG. 15 is repeated for other values of j with the results summed to provide the final converted output to the optical/electrical data processors 16 (FIG. 6). The output of the light switch 200*a* provides inputs to channel one of the adder 230 and are connected to the 0 and 3 inputs thereof. The 3 input is appropriate since 10 mod 7=3. The outputs of light switch 200*b* are transmitted via the light transmitting group 40*a*$_1$ to the channel 2 input of the adder 230 and are connected to terminals 0 and 6 thereof. The 6 input terminal is appropriate inasmuch as 20 mod 7=6. In a similar fashion the light outputs of the light switch 200*c* are connected via the light transmitting group 40*a*$_2$ to the channel 1 input of adder 232 and are connected to terminals 0 and 5 thereof. Finally, the light output of switch 200*d* is connected via the light transmitting group 40*a*$_3$ to the channel 2 input of adder 232 and connected to inputs 0 and 3 thereof (80 mod 7=3). The possible outputs of adder 230 are 0, 2, 3 and 6 and the result of the addition is transmitted along the light transmitting paths 236 to the adder 234. Similarly, the possible outputs of adder 232 are 0, 1, 3 an 5 and these outputs are fed via the light transmitting paths 238 to provide channel 2 inputs to the adder 234.

It is noted that the adders illustrated in both FIGS. 14 and 15 may be fabricated utilizing the arithmetic and logic units as described below and as further disclosed in copending applications Ser. No. 019,761 and U.S. Pat. No. 4,797,843.

The two methods discussed above both involve summation over k first and then over j in equations (12) and (17), respectively. The third method is similar to the second method and employs equation (17) but sum over j first, then over k. In terms of FIG. 15, this method keeps the exponent on 2 fixed and varies the exponent on 10 over the number of decimal digits required with as many adders in parallel as are needed FIG. 16 is similar to FIG. 15 and illustrates the technique of this third method. In FIG. 16 it may be seen that the powers of 2 are taken all with the exponent 1 (k=1 in equation (17)) with the powers of 10 increasing. The various input and output terminals of adders 230 and 232 have now been modified in relation to FIG. 15 to represent the appropriate connections for summation over j first followed by summation over k. In this third method, the conversion of BCD to residue for the moduli 2 and 5 form a special case and need only account for the four lowest order bits, the four "1's" bits since the residue of the higher order bits are 0 or these moduli.

Mixed Radix to Residue Representation

Mixed radix digits are derived from the residue representation of a number as a preliminary to sign determination, magnitude comparison, and conversion to decimal or binary representation A number x is represented in mixed radix form coordinated with the residue number system by $$x = a_N \prod_{i=1}^{N-1} m_i + a_{N-1} \prod_{i=1}^{N-2} m_i + \ldots + a_2 m_1 + a_1 \quad (18)$$

where $m_i$ are the moduli of the residue number system. From equation (7d), one obtains the following formula for the residues of x in terms of the mixed base digits:

$$x \bmod M_i = |x|_{mi} = \left| \sum_{j=1}^{N} |a_j|_{mi} \left| \pi_{k=1}^{j-1} m_k \right|_{mi} \right|_{mi} \quad (19)$$

For specific moduli $m_i$, the following simplifications occur, based on the theorem, shown in Szabo's and Tanaka's text (reference 9 ), that the residue of a multiple of the modulus $m_i$ is zero:

$$|X|_{m_4} = |a_4 \cdot |m_3 m_2 m_1|_{m_4} + |a_3|_{m_4} \cdot |m_{2/m1}|_{m_4} + |a_2|_{m_4} \cdot |m_1|_{m_4} + |a_1|_{m_4}|_{m_4} \quad (20a)$$

$$|X|_{m_3} = |a_3 \cdot |m_2 m_1|_{m_3} + |a_2|_{\text{mhd } 3}|m_1|_{m_3} + |a_1|_{m_3}|_{m_3} \quad (20b)$$

$$|X|_{m_2} = |a_2 \cdot |m_1|_{m_2} + |a_1|_{m_2}|_{m_2} \quad (20c)$$

$$\text{For } m_1\text{: } |x|_{m_1} - |a_1|_{m_1} = a_1 \quad (20d)$$

The conversion method for the $m_1$ modulus is the simplest. Only $a_1$ need be presented to the input, via sufficient delay stages that it arrives at the output synchronously with the other residue digits, to maintain the desired pipelining property. For the rest of the radices, some computation is needed.

The mixed radix digits $a_i$ must be converted to residues at the beginning of the algorithm. The computation may be done in the design stage. A useful special property of $a_i$ is that it is less than $m_i$, but not necessarily less than any other $m_j$.

The products of the m's in equation (20*a*)-(20*b*) have the same role as the weights $w_i$ of equation (7d). The required residues may be computed in the design stage of the conversion apparatus as in FIG. 10. The corresponding "one-of-n" source light is connected to the optical multiplier input and is turned on whenever conversion is wanted.

Further, as explained above in connection with FIGS. 11 and 12, the optical multiplier stages may be replaced by a fixed interconnect pattern using a double stage or a single stage design.

FIG. 17 is similar to FIG. 7 and illustrates the conversion method from mixed base digits to the residue modulo $m_4$ of a four-modulus system. This design is based on equation (20a).

Figure 18:
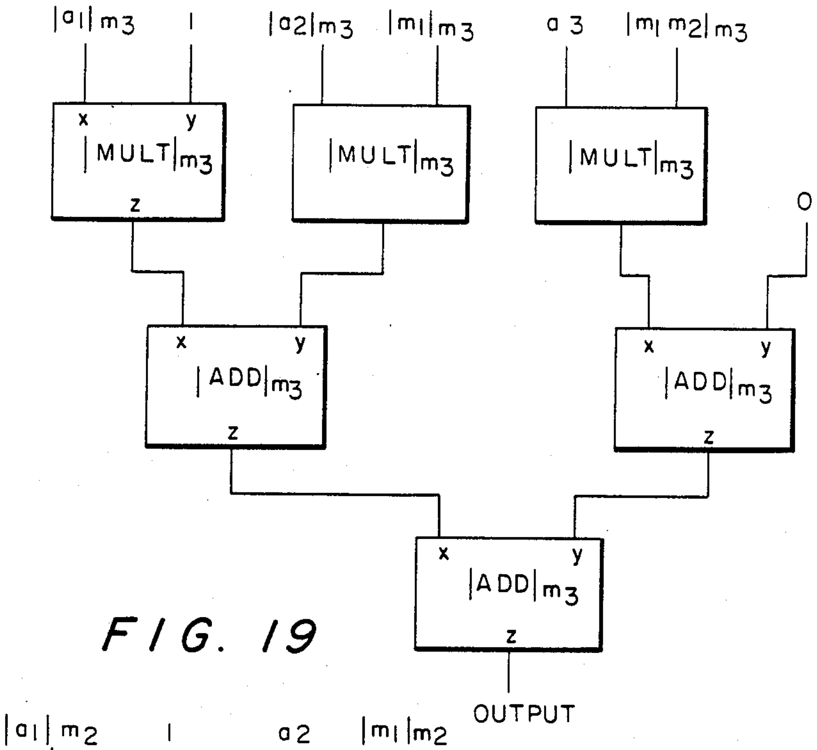
Figure 19:
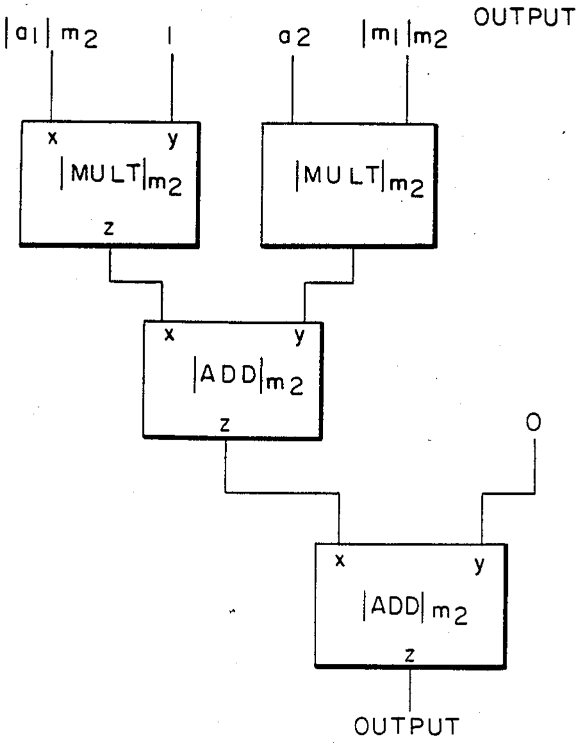
Figure 20:
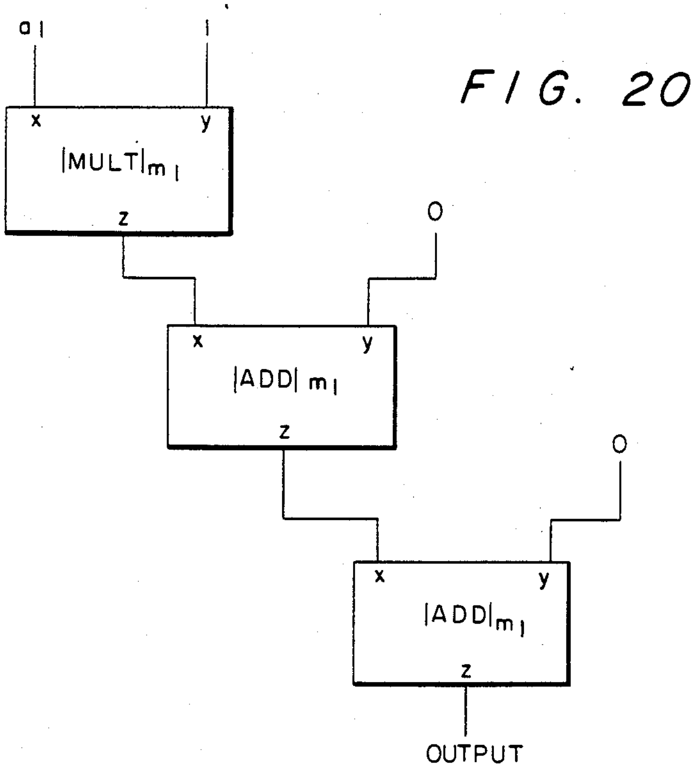

FIGS. 18, 19 and 20 show the conversion methods for the residue digits found from equations (20b), (20c) and (20d), respectively. Note that some of the arithmetic/-logic units are retained only for their delay properties thus serving a similar purpose of delay 120 of FIG. 8. This is to ensure that all the residue digits arrive simultaneously at the output of the overall algorithm, as required of pipelined processing.

For residue systems with more than fouf moduli, it is readily apparent that additional stages will be needed in all of the conversions to maintain output synchronism.

Optical Arithmetic/Logic Unit

The various multipliers and adders shown in FIGS. 7-20, including the ALU's 80*a*-80*c* of FIG. 6, may be fabricated utilizing the optical arithmetic and logic units described in copending applications Ser. No. 019,761 and U.S. Pat. No. 4,797,843. The optical ALU shown in Ser. No. 019,761 is briefly discussed herein below in relation to FIGS. 21-27.

Figure 21:
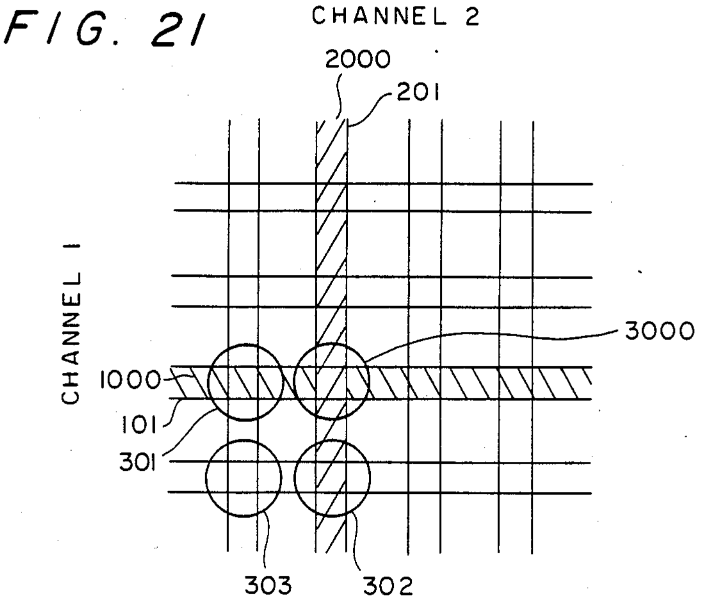
FIG. 21 is a schematic drawing showing the basic concept of the optical cross bar arithmetic/logic unit.

As shown in FIG. 21, the basic concept of the optical cross bar arithmetic/logic unit (ALU) is shown using a 4×4 ALU. Input 1000 from Channel 1 and input 2000 from Channel 2 transmit light in optical paths 101 and 201 respectively to intersect at a region designated by reference number 3000. Thus, the level of light intensity at intersection region 3000 is equivalent to two units of light. In comparison, the level of light intensity detected at intersecting regions 301 and 302 is only one unit of light, and the level of light intensity detected at intersecting region 30 is zero. By detecting the level of light at region 3000, one may determine the state of activation of input light paths 101 and 201.

Some examples of possible truth tables are shown in FIGS. 22 and 23. FIGS. 22A and 22B show examples of the kinds of two level logic tables associated with standard Boolean algebra, the AND and EXCLUSIVE-OR tables, respectively. FIG. 22C shows an example of a multi-value logic table, specifically showing a table for modulo 3 residue addition, whereas FIG. 22D illustrates multiplication. The lack of carry operations is apparent, which thus makes parallel processing possible. FIG. 23A shows a modulo 5 residue multiplication table, and FIG. 23B indicates how the reduced table (with zeros removed) can be made anti-diagonal via permutation, as discussed by Szabo and Tanaka (reference 9).

Devices to evaluate all o these tables using the optical cross bar technique can be constructed.

An example of a possible optical embodiment of the EXCLUSIVE-OR operation (FIG. 22B) is shown in FIG. 24. Optical paths 410, 41, 420 and 421, defined by the fiber optics, are split into two individual optical paths also defined by the fiber optics, as shown, for example, by paths 410*a* and 410*b* for optical path 410. Paths 410*a* and 410*b* direct transmitted light from an LED 413 towards detectors 432 and 434, respectively. Paths 421*a* and 421*b* direct transmitted light from an LED 419 towards detectors 434 and 438, respectively. LED's 415 and 417 are used for directing light along paths 411*a*, 411*b* and 420*a* and 420*b* to respective detectors 436, 438 (for LED 415) and 432, 436 (for LED 417). Assuming for the representative EXCLUSIVE-0R operation that only LED's 413 and 419 are energized, light from paths 410*b* and 421*a* are crossed at detector 434 whereby detector 434 detects two units of light to be discriminated by threshold unit 444. Threshold units 442, 446 and 448 are likewise connected to their corresponding detectors 432, 436 and 438, respectively.

A second optical embodiment of the EXCLUSIVE-OR operation is shown in FIG. 25 and utilizes integrated optics. In this form, optical waveguides 451*a*-451*d* define optical paths 10′, 11′, 20′ and 21′, respectively, and are made to intersect at optical bistable devices 450*a*-450*d* as shown. The optical bistable devices 450*a*-450*d* are non-linear devices which can perform an AND operation, i.e., they only turn on when two light inputs are present. In the example shown, the bistable device 450*c* permits the transmission of light, indicated by arrows 462, from a sampling beam designated by arrows 460 only when an intersecting region of the device 450*c* has two units of light crossing. For the example shown, this will only occur where path 11′ intersects path 20′. Equivalent outputs, such as those found at bistable devices 450*a* and 450*c*, can be combined at this point using standard optical techniques.

The extension of the above embodiments from binary to multi-level logic is straightforward and will now be explained.

Figure 26:
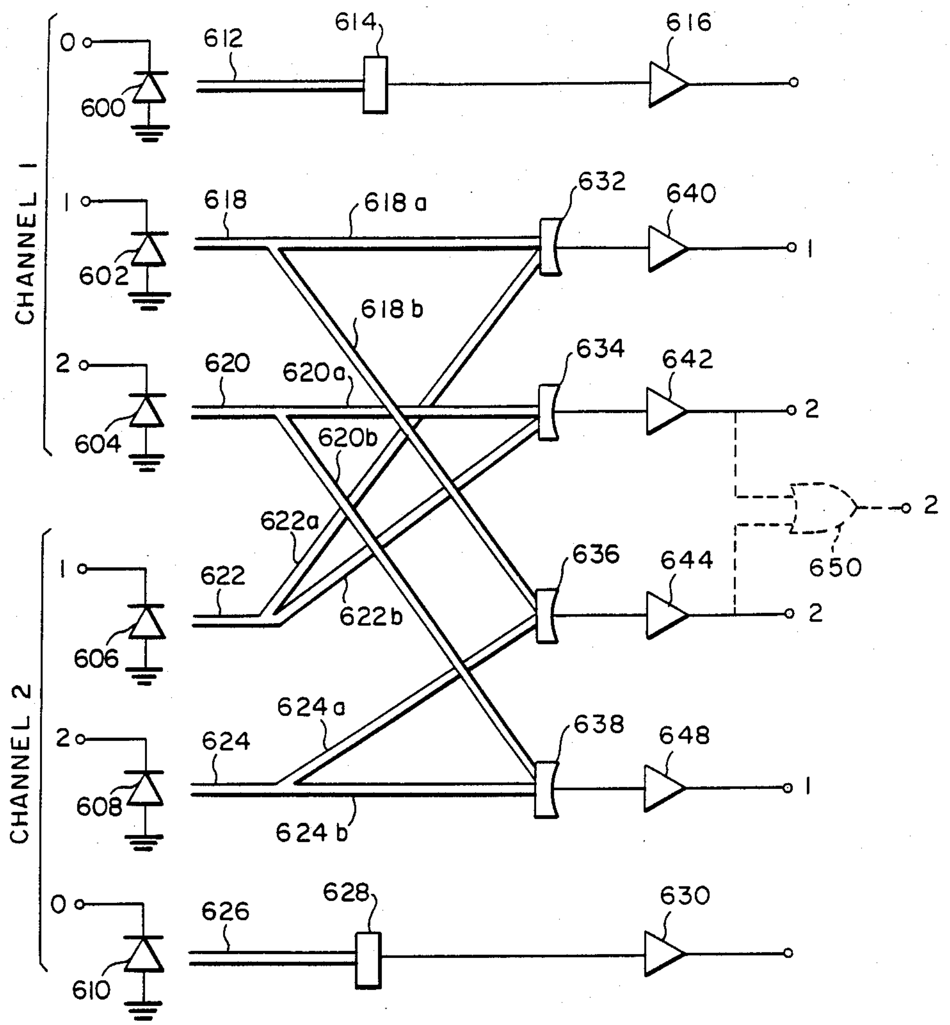
FIG. 26 is an example of a modulo 3 multiplier which may utilized as an arithmetic/logic unit.

FIG. 26 is a diagram of an optical multiplying circuit configured to carry out a modulo 3 multiplication in accordance with FIG. 22D. FIG. 26 is seen to comprise a plurality of LED's 600, 602, 604, 606, 608 and 610. LED's 600, 602 and 604 correspond to the channel 1 input of the multiplier and receive electrical signals associated with the first number to be multiplied, ad the LED's 606, 608 and 610 are associated with channel 2 of the multiplier and receive electrical signals corresponding to the second number to be multiplied. Adjacent each LED is an optical path 612, 618, 620, 622, 624 and 626 fabricated from fiber optics. Optical path 612 nnd 626 correspond to the zero value of each digit within channels 1 and 2, respectively. Light from the optical paths 612 is fed to a detector 614 where an electrical signal is generated having an amplitude corresponding to the intensity of incident light. The electrical signal is fed to a threshold unit 616 which generates an electrical signal if the amplitude of the input signal thereto is greater than the a predetermined threshold. Likewise, light from the light path 626 is fed to a detector 628 where an electrical signal is generated and fed to the threshold unit 630.

FIG. 26 is further seen to comprise a plurality of additional detectors, 632, 634, 636 and 638 associated with a plurality of additional threshold units 640, 642, 644 and 648. Each light paths 618, 620, 622 and 624 is split into a plurality of two separate light paths. Light paths 618 is split into optical light paths 618*a* and 618*b* wherein path 618*a* directs light to the detector 632, and light path 618*b* directs light to detector 636. Light path 620 is split into light paths 620*a* and 620*b* wherein light path 620*a* directs light to detectors 634, and light path 620*b* directs light to detector 638. Light path 622 is split into light paths 622*a* and 622*b*. Light path 622*a* directs light to detector 632, and light path 622*b* directs light to detector 634. Finally, light path 624 is split into light paths 624*a* and 624*b*. Light path 624*a* directs light to detector 636, and light path 624*b* directs light to detector 638. The threshold units of detectors 640, 642, 644 and 648 are set to provide an electrical signal output when the amplitude of the incoming electrical signal is representative of two units of incident light. For example, assuming that all of the LED's emit two units of light (a unit being an arbitrary intensitive value) then each of the split light paths 618*a*, 618*b*, 620*a*, 620*b*, 622*a*, 622*b*, 624*a* and 624*b* carry one unit of light intensity whereas light paths 612 and 626 carry two units of light intensity. Assuming now that the number incident on channel 1 corresponds to the number 2 and the number incident on channel 2 likewise corresponds to the number 2, the multiplication unit shown in FIG. 26 carries out the multiplication such that $2 \times 2 = 4$ modulo $3 = 1$. In this case, light from the LED 604 passes through the light path 620*b* onto detectors 638. In channel 2, light from the LED 608 passes along light path 624*b* and falls incident on the detector 638. Consequently, detector 638 measures two units of light and provides a corresponding electrical signal to the threshold detector 648 which generates a high level output electrical signal as a result thereof. The outputs of the other threshold units are 0 since none of these units measure an electrical signal corresponding to two units of light intensity incident on their respective light detectors.

In FIG. 26, light path 612 in channel 1 and light path 626 in channel 2 are each fed directly to corresponding detectors and threshold units s that a 0 output is provided whenever any input to either channel 1 or 2 is 0. It is noted that the output signals of FIG. 26 may serve as inputs to other ALU's which have a similar structure as in FIG. 26. In this connection, similar valued outputs such as the outputs 642 and 644 may be fed to separate inputs of an OR gate for providing a single output line. For example, OR gate 650 provides an output whenever the results of the multiplication are 2. In a similar fashion (not shown) the outputs from threshold units 640 and 648 may be OR'ed together to provide a 1 output and the outputs of threshold units 616 and 630 may be OR'ed together to provide a 0 output. These outputs, 0 1 and 2 may then be fed as a channel 1 input to a downstream optical ALU. Such a procedure of serially connected the desired multiplication, addition, subtraction and logical units serves to implement the previously described FIGS. 7-20.

Figure 27:
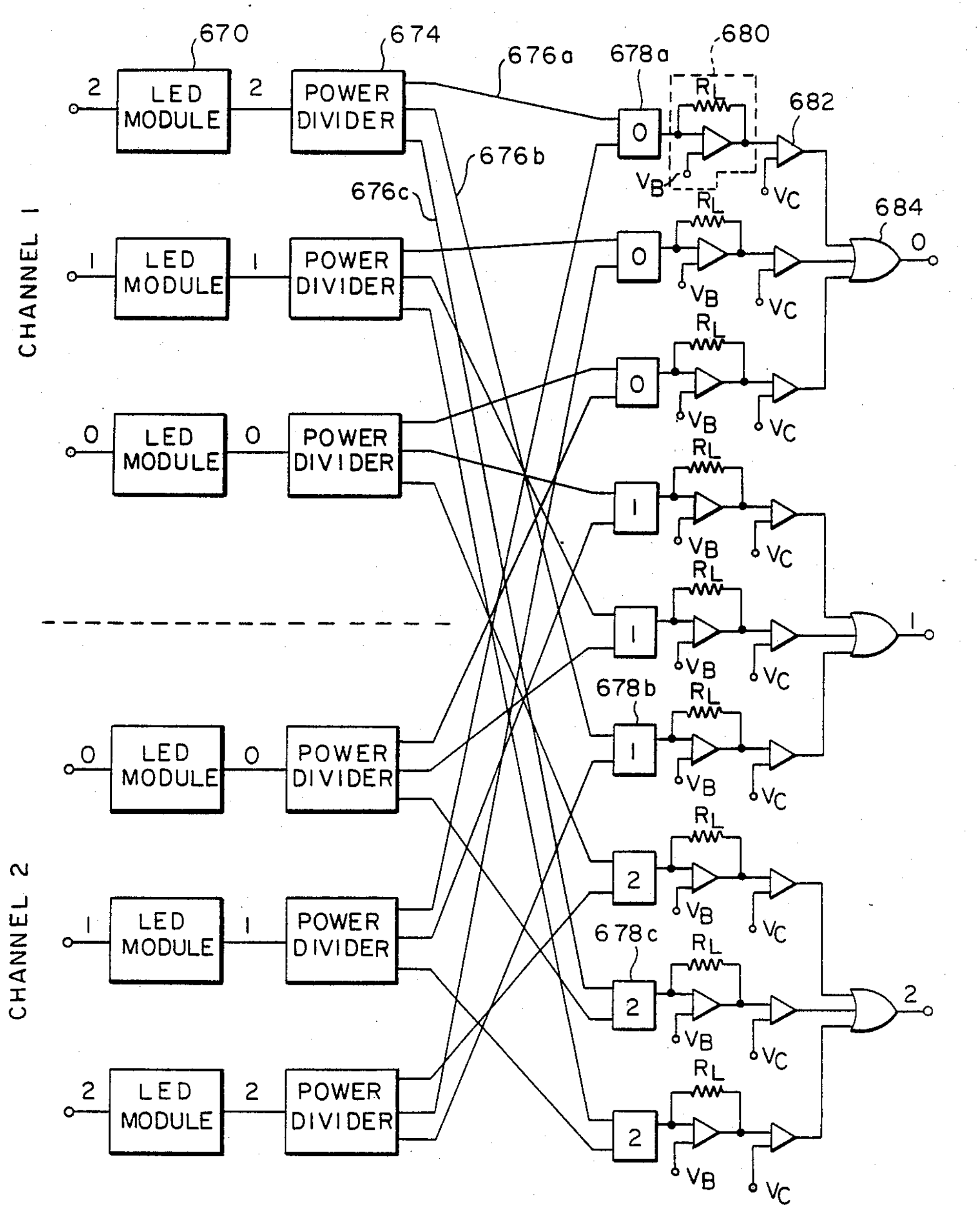
FIG. 27 is a schematic representation of an optical modulo 3 adder utilized as an arithmetic logic unit.

An example of a fiber optic modulo 3 adder for realizing the multi-value logic table of FIG. 22C is shown in FIG. 27. For the sake of simplicity, the configuration will be described in detail only with respect to one input of channel 1. The remainder of the inputs of channel 1 and channel 2 are identical. LED module 670 transmits light through an optical fiber 672 to a power divider 674 where the intensity of the transmitted light is divided equally between optical fibers 676*a*, 676*b* and 676*c*. Fibers 676*a*, 676*b* and 676*c* define optical paths leading to detectors 678*a*, 678*b* and 678*c*, respectively. Each of the detectors 678*a*, 678*b* and 678*c* also receives a second optical path from one of the channel 2 inputs in such a way that the optical paths from channels 1 and 2 intersect. Each of the detectors 678*a*–678*c* is indicative of a result in the multi-level logic table shown in FIG. 22C.

In the Example of FIG. 27, it is assumed that each optical fiber at the output of the power dividers carries one unit of light intensity. Applying the technique of the present invention, when one optical path from channel 1 is transmitting light and intersects an optical path from channel 2 that is also transmitting light, two units of light intensity will be detected by the respective detector. Discrimination is achieved be amplifying an electrical signal indicative of the two units of light intensity at the respective amplifier circuit 680 and comparing the amplified signal with a reference voltage $V_c$ at a respective comparator 682. Thus, whenever an intersection contains two units of light, the output of the respective comparator 682 will be set high. This high input is in turn OR'ed at a respective OR gate 684, thereby yielding the correct multi-level logic table output. Identical configurations can be used to compute other multilevel logic tables, including residue multiplication, by simply reassigning the outputs according to the permuted logic table as shown, for example, in FIG. 23B.

Note that both the integrated optics (FIG. 25) and the optical and electronic (FIGS. 26 and 27) embodiments will achieve the desired result, although the integrated optics version utilizing the cross bar technique is able to operate at significantly higher speeds. The R-C time constants of the electronic interconnects shown in FIGS. 26 and 27 will limit the response time to values on the order of 1 nsec. However, the speed of the integrated optics device is primarily limited only by the response time of the final non-linear AND operation. The integrated optics configuration would thus permit high speed operation with demonstrated optical bistable switching speeds of 10's of psec. (e.g., GaAs multi-quantum well devices).

In general, the cross bar optical technique uses $n^2$ non-linear threshold elements to evaluate an n by n truth or multi-level logic table. Since typical values of n will be less than 30 for adequate residue representation of, for example, 32 bit numbers, the number of required threshold elements may be easily produced by current thin film fabrication methods.

The optical ALU's utilized to fabricate the various multipliers/adders in FIGS. 7-20 and ALU's 80*a*–80*c* of FIG. 6 may also be made utilizing a Fourier transform or pattern recognition type unit as described in U.S. Pat. No. 4,797,843 and in relation to FIGS. 28-33 herein.

Referring more particularly to FIG. 28, the basic operation of the optical ALU can most easily be illustrated in an AND logic unit form. Four mutually coherent point sources 720–723 that can be individually turned on or off are provided in a spaced relationship along a plane A. Source 720 is the "true" source and source 721 is the "false" source thereby forming input I (channel 1 input). Source 722 is the "false" source and source 723 is the "true" source of input II (channel 2 input). The sources 720–723 are arranged along a line and separated by equal distances d. Lens 730–732 are placed along the same focal point B one focal length f away from the sources 720–723 to produce Fourier transforms of the source configuration generated when one of the sources is turned on from each of input I and input II. The Fourier transforms are produced along focal plane C one focal length away from lenses 730–732 where Furrier transform filters 740–742 are located. It is a well-known property of the Fourier transform that, apart from an overall phase, the transform depends only on the structure of the pattern, not its absolute location. Thus, sources a distance **2*d* apart will produce the same transform, whether the sources 720 and 722 are on, or sources 721 and 723 are on. FIG. 29** shows the four possible input patterns, the spacing between sources for each of the patterns and the desired output state.

By way of example, as shown in FIG. 28, light from source 720 of input I and source 722 of input II passes with highest transmission through the filter 741 labelled "**2*d*" as the sources 720 and 722 are a distance "2*d*" apart. This energy is collected by the lenses 750 to 752 in the lens array along focal plane D located one focal length away from filters 740 to 742. The energy allowed to pass through lenses 750–752 is then focused onto light collectors 760 to 762 (e.g., square law devices) located in plane E one focal length away from lenses 750 to 752. The maximum intensity, by at least a two-to-one margin, will fall on collector 761. Thresholding (not shown but similar to that shown by threshold detectors 640–648 of FIG. 26) will then allow energy to pass through only one channel, the one corresponding to the correct answer. The collector 761, behind the "2*d*" filter 241, is connected to designate a "false" output. Thus, a "true-false" input, i.e., source 720 and 722 on, results in a "false" output, as required by the truth table in FIG. 29. Further, the filter 741 passes light resulting from the other possible "2*d*" configuration in which only sources 721 and 723 are on, corresponding to a "false-true" input condition. In this case, a "false" output designation likewise results from collector 761. Similarly, the "1*d*" channel passing through filter 740 and lens 750 leads to a "false" output. However, light from the "*d*" channel passes through filter 742 and lens 752 and is directed to collector 762 designating a "true" output. The collectors 760 to 762** in Plane E can be either detectors if an electronic output is desired, or optical non-linear devices (e.g., optical bistable switches) for an optical output.

The optical ALU may take the form of a fully parallel adder. Given a linear source configuration of point sources 720 to 725, analogous to that shown in FIG. 28, the adder 700 for modulus 3 is shown in FIG. 30, and incorporates the input/output relationships shown in FIG. 31. The realization of the adder for modulus 3 with the example $1+2=0$, illustrated in FIG. 30, is similar in construction to the AND logic unit of FIG. 28 with the labels d, f, A, B, C, D and E referring to the same items as in FIG. 28. As representative examples, focal length f is 200 mm and the distance d between point sources is 125 microns.

Referring to FIG. 30, point sourcss 720–722 make up one channel labeled "input I" while sources 723–725 make up the second channel "input II". Lenses 730–734 lie along focal plane B one focal length f away from the sources positional in plane A. Fourier filter 740–744 lie along focal plane C one focal length away from lenses 730–734 in plane B. Lenses 750–754 lie along focal plane D one focal length away from filters 740–744. Detectors 760–764 lie along focal plane E one focal length away from lenses 750–754. Thus, since the spacing between source 721 and source 725 is **4*d*, filter 743 and lens 753** allow the maximum intensity of light to emerge, thereby indicating an output of 0.

The Fourier transform or pattern recognition type of ALU as described in FIGS. 28–32 requires that the light sources input thereto be spaced relative to one another in a predetermined order and by equal spacings, d. Generally speaking, however, the output of the residue converters **60–*a*–60–*c* and 70–*a*–70–*c* are provided on light transmitting paths which need not be spaced apart from one another by this same equal distance d. Thus, optical converters 76*a*–76*c* are utilized to properly space the light transmitting paths 62*a*–62*c* and 72*a*–72*c* so that end portions of the these paths may form light sources as inputs to the ALU's 80*a*–80*c*. A typical optical interface 76*b* of FIG. 6 is shown in detail in FIGS. 33A and 33B. In accordance with FIG. 33A, the inputs along the light transmitting paths 62*b* and 72*b* are already properly spaced but are not configured in the required input relationship appropriate, for example, to the modulo 3 logic of FIG. 30. As a consequence, optical coupling paths 780*a* and 780*b* serve to couple the light transmitting paths 62*b* and 72*b* together such that the resulting output along light transmitting paths 780*c* are properly spaced from one another. The end portions of these optical paths 780*c*, identified by "s" in FIGS. 33A an 33B, form the light sources of FIG. 30**.

Figure 33A:
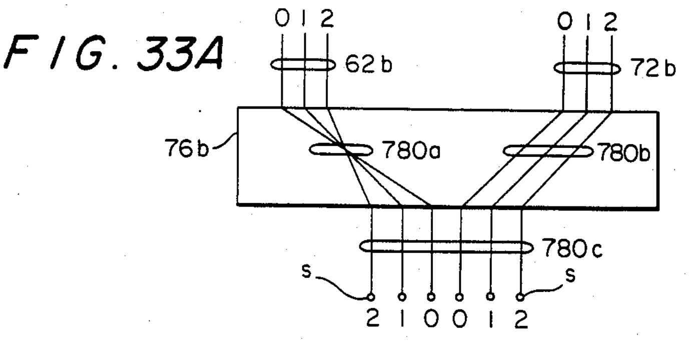
FIGS. 33A–33B illustrate block diagrams of an optical interface utilized in FIG. 6.
Figure 33B:
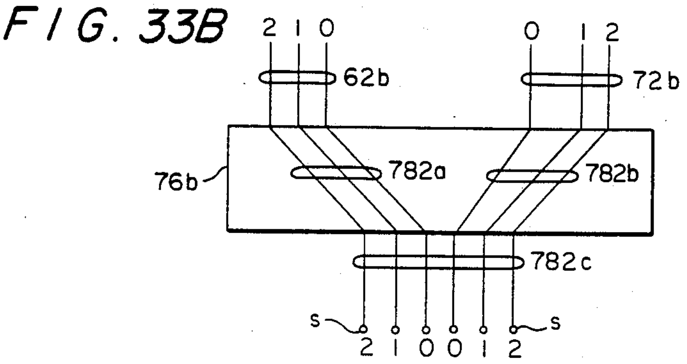

In connection with FIG. 33B, it is noted that the relative position of the light transmitting paths **62*b* and 72*b* are appropriate for inputs to the logic circuits shown in FIG. 30 but their relative spacing is not equidistant. In this embodiment, the optical interface 76*b* couples the light transmitting paths 62*b* and 72*b* to the output light transmitting paths 782*c* via the optical coupling paths 782*a* and 781*b*. Again, end portions of the light transmitting paths 782*c* form the point sources as inputs to the optical logic/arithmetic circuit of FIG. 30**.

It is noted that combinations of the embodiments shown in FIGS. 32A and 32B are readily apparent wherein the optical interface both reconfigures the incoming light transmitting paths and provides proper equal spacing such that the output of the optical interface is both properly oriented and spaced to provide a suitable input to the ALU as shown in FIG. 30. Further, it is understood that similar optical interfaces may readily be constructed for the modulo 2 ALU **80*a* and the modulo 5 ALU 80*c*** or any other ALU's with arbitrary modulus.

The geometric relationship between the inputs and the addition result can be generalized as follows. The addition of any two numbers in the modular system, $n_1$ from input I and $n_2$ from input II, is related to the spacing between the two sources in the input pattern indicative of $n_1$ and $n_2$. Thus, in residue addition, $(n_1+n_2)$ modulo p, where p is the modulus corresponds to the spacing between $n_1$ and $n_2$ according to the relationship $(n_1+n_2+1)d$. Furthermore, the modulo p adder requires $2p-1$ linear optical elements in each focal plane B, C, and D.

The optical ALU can also take the form of a multiplier. In this form it exploits the property of residue arithmetic that the non-zero numbers in modulus p, where p is a prime number, form a closed set under the multiplication operation. Practically, this means that an $N \times N$ multiplication table has only N entries, rather than $N^2$ as in ordinary multiplication, so that only order N, rather than $N^2$, filters are required for selection of the appropriate final state. This greatly simplifies the construction of the device. The implementation of this relationship is basically the same as the adder of FIG. 30. However, for multiplication, one may make use of a permutation of the input numbers as is discussed by N. S. Szabo, and R. I. Tanaka, reference 9, for example chapter 8.

Figure 32:
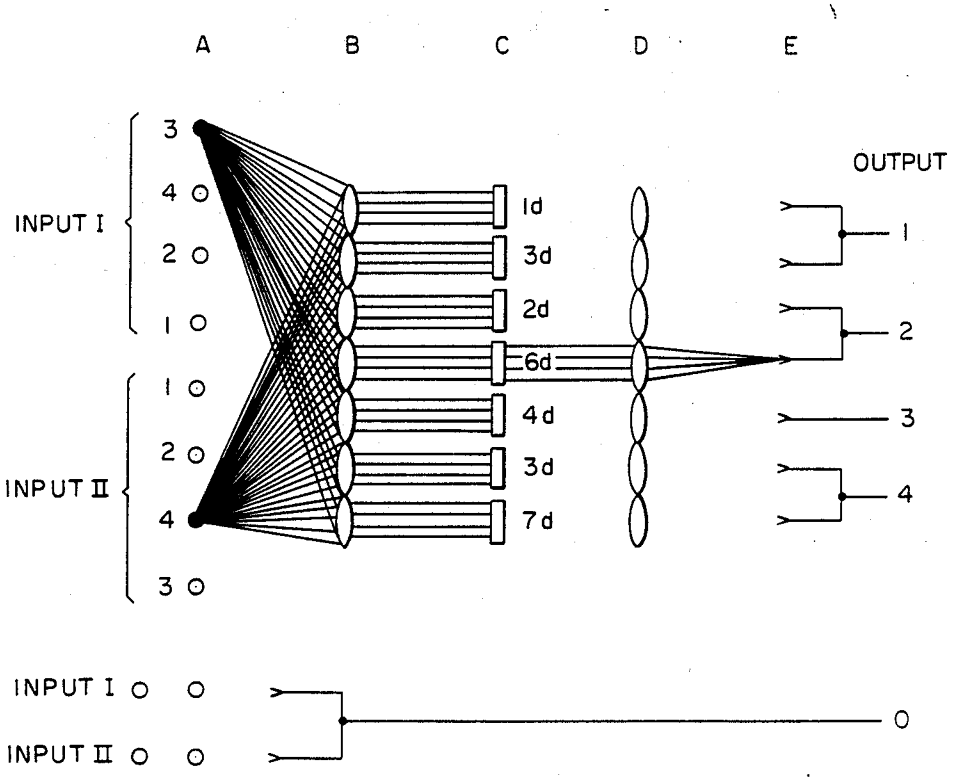
FIG. 32 is a schematic drawing of a parallel optical modulo 5 multiplier utilized as an arithmetic/logic unit.

FIG. 32 shows the permutation concept applied with a modulo 5 multiplier used as a specified example. Note that 0 is treated as a separate channel in the residue multiplier. The permutation required to transform the remainder of the inputs is based on the following rule. For any prime modulus, p, a generator, x, exists such that the input order is 1, x, $x^2$, $x^3$, . . . $x^{p-2}$. Thus, if p=5 (modulo 5 multiplier) then x can equal 2 or 3. If for example, 2 is chosen, the permuted order of inputs is 1, 2, 4, 3.

The permuted truth table for a modulo 5 multiplier is shown in FIG. 23B. In FIG. 7, the reference letters d, f and A–E refer to the same items as in FIG. 28 and FIG. 30. Note that the only additional complications of the multiplier over that of the adder are that a separate channel must be included that allows light from zero entries to pass directly to the output and that a filter must discriminate against a single input, i.e., a non-zero number multiplied by zero, as well as incorrect spacing.

The geometrical relationship between the inputs and the multiplication result can be generalized as follows. The multiplication of any two numbers in the permuted input order, $x^n$1 from input I and $x^n$2, from input II, is related to the spacing between the two sources in the input pattern indicative of $x^n$1 and $x^n$2. Both $n_1$ and $n_2$ represent the position in input I and I, respectively. For example, as sown in FIG. 32, the source for 1 in input I corresponds to $n_1=0$ while the source for 4 in input II corresponds to $n_2=2$. Thus, in residue multiplication, ($x^n$1 x $x^n$2) modulo p, corresponds to the spacing between $x^n$1 and $x^n$2 according to the relationship $(n_1+n_2+1)d$. Furthermore, a modulo p multiplier requires $2p-3$ linear optical elements in each plane B, C and D.

The optical ALU can be extended to perform residue subtraction. Furthermore, the lenses in plane B might alternatively be replaced with a single spherical lens. Similarly, the lenses in plane D might alternatively be replaced by a single cylindrical lens. Finally, for ease of discussion, the optical ALU has been described with reference to only two channels of light sources, but clearly can be extended for applications requiring three or more channels.

Residue-to-Binary Conversion

The residue-to-binary converter 84 of FIG. 6 is now described. One of the main impediments to the use of residue number systems in computer technology has been the lack of an efficient means to convert the residue computation result to a binary, or other fixed base, number. In the past, the main technique has been to perform a digital computation using the Chinese Remainder Theorem algorithm to obtain the conversion. (See reference 9, pp, 27–33.) The problem with this approach is that intermediate results in this algorithm can be very large compared to the final number range so that much larger word size adders and multipliers are required for the intermediate calculations. For example, in some cases an eight bit result can require up to twenty-three bits in the intermediate steps. Use of these large word size devices can slow the calculations enough so that any gain from using a residue number system is lost. In accordance with the invention, a nonarithmetic means is utilized performing the residue-to-binary conversion.

Figure 34:
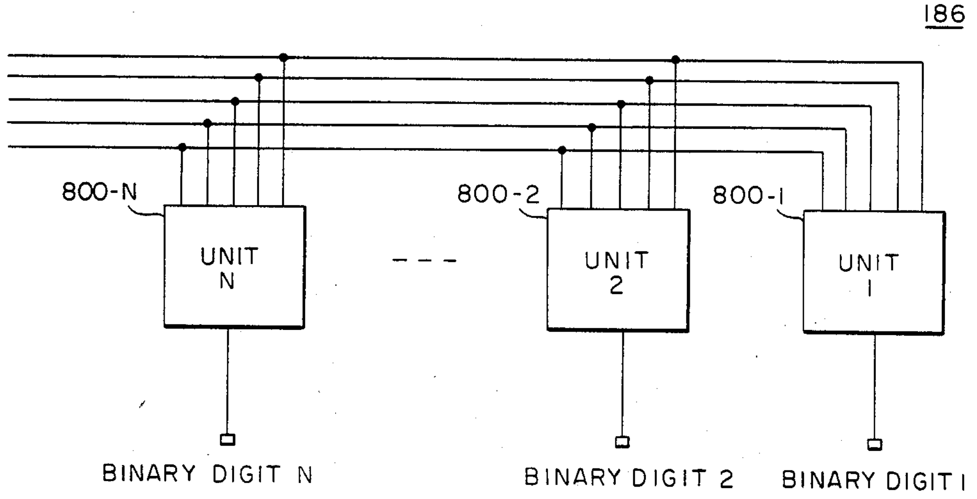
FIG. 34 is a block diagram of a parallel residue-to-binary converter.

The basic concept of the residue-to-binary conversion technique is illustrated in FIG. 34. The residue number in a one-of-many representation is presented in parallel to N converter units 800-1, 800-2 . . . 800-N. One converter unit is provided for each binary digit. The output of each is either a 0 or 1, and the N outputs form the N-bit binary word which is the conversion of the input residue number. If the residue number is represented using moduli $m_1, m_2, \ldots, m_k$ then N is the integer which least exceeds $$\ln\left( \underset{j=1}{\overset{k}{= \pi}}\ m_j \right) / \ln(2),$$

unless this ratio happens to be an integer (seldom) in which case N is equal to the above ratio. FIG. 35 shows a table containing the decimal, residue (with moduli 2, 3, and 5), and binary representations (N equal 5) of the numbers 0 through 29 so that specific examples may be used to illustrate the functioning of the individual converter units.

Figure 36:
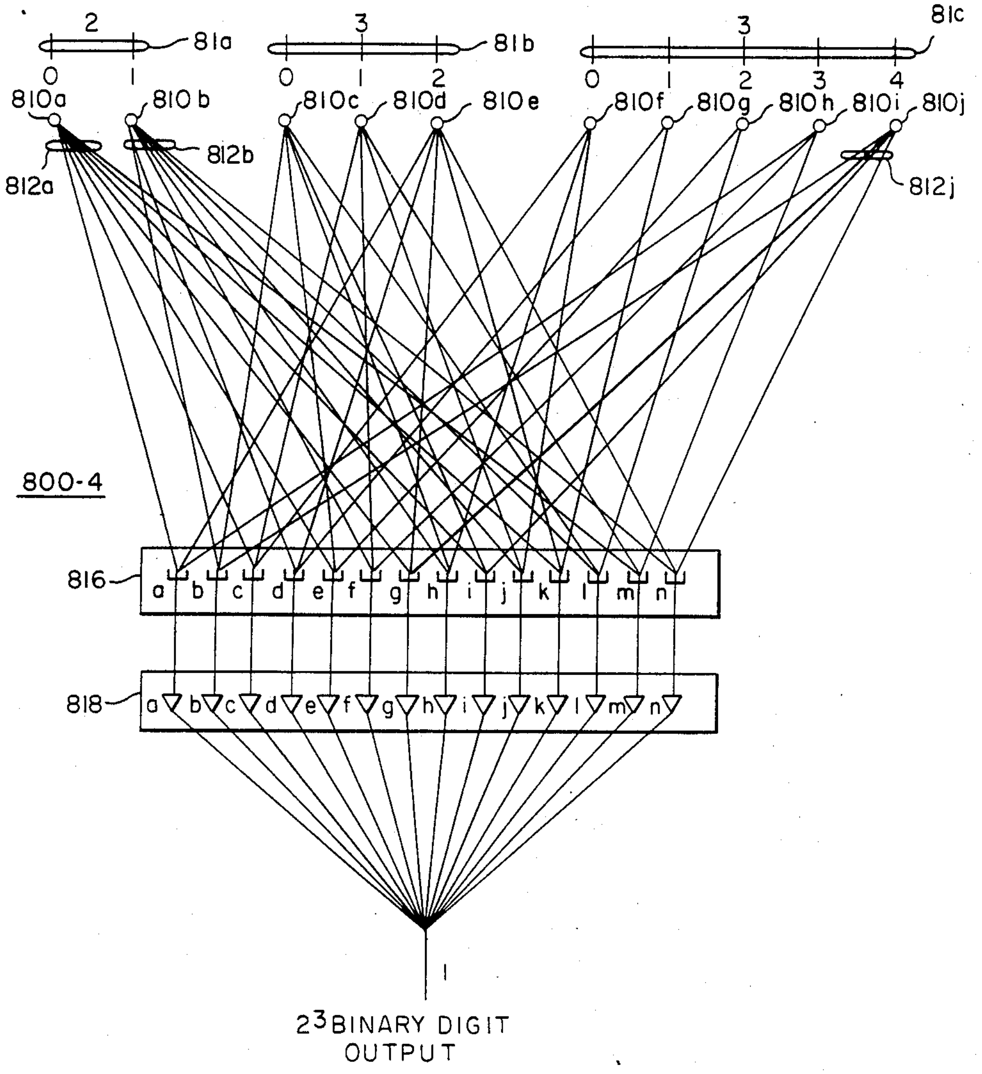
FIG. 36 is a block diagram of a first embodiment of a parallel residue-to-binary converter.
Figure 37:
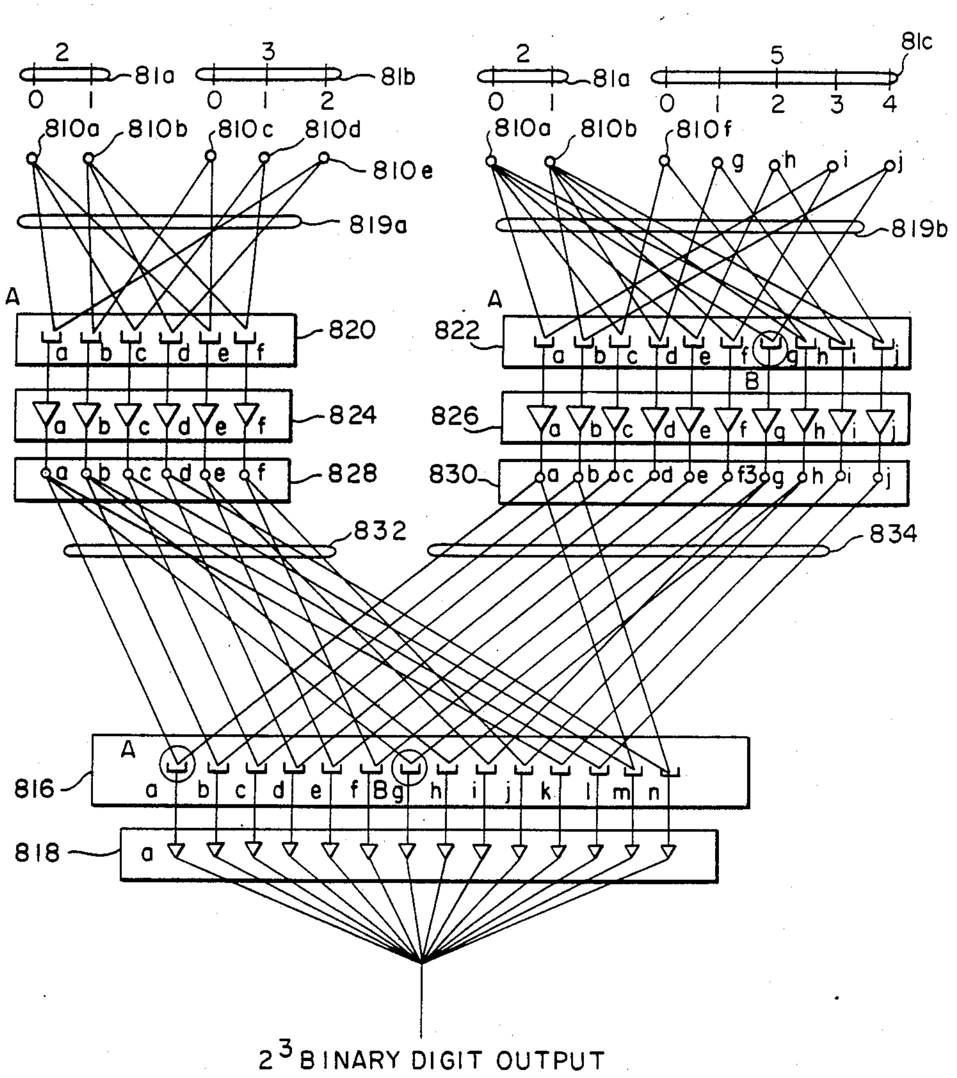
FIG. 37 is a second embodiment of a parallel residue-to-binary converter.

Two forms of the individual converter units 800-1, . . . 800-N are shown in FIGS. 36 and 37. Conceptually the two forms are very similar but there are some differences that will affect he choice of which unit to use in a particular application. Both FIGS. 36 and 37 implement the converter unit 800-4 corresponding to the binary digit 8. First turning to FIG. 36, it may be seen that the converter unit 800-4 contains at its input the one-of-many representation of the residue number for each of the moduli employed. For example, in reference to FIG. 6, the residue/binary converter 84 is fed with inputs from the ALU unit 80*a*, 80*b* and 80*c* corresponding to the moduli 2, 3 and 5, respectively along their respective communication paths 81*a*, 81*b* and 81*c*. The communication paths 81*a*, 81*b* and 81*c* may be either electrical one-of-many electrical conductors or optical one-of-many light transmitting paths depending upon he output of the ALU's 80*a*–80*c*. In the event that the communication paths 81*a*–81*c* are electrical conductors, each converter 800 is supplied with an LED 810*a*–810*j* as illustrated. These LED's form light sources which provide light along light transmitting paths 812*a*–812*j*, respectively. The size of the light transmitting paths 812*a*–812*j* are typically not of the same cross-sectional area but are selected such that the light intensity travelling along any illuminated path 812*a*–812*j* is identical and may be arbitrarily selected as a unit of intensity, I. For this purpose, LED's of different intensity output may also be selected or filters may be provided between the LED's and light transmitting paths 812 as desired. In the event that tee communication paths 81*a*–81*c* are a one-of-many optical type, these communication paths may be directly connected to the light transmitting paths 812*a*–12*j* to likewise achieve the same intensity on the light transmitting paths 812*a*–812*j* for any given residue number to be converted. In this latter case, the cross-sectional area of the light transmitting paths 812*a*–812*j* may be varied to achieve the desired common intensity or filters may again be provided between the light transmitting paths 81*a*–81*c* and 812*a*–812*j* as required.

The light transmitting paths 812a–812j are connected to a plurality of detectors 816a–816n which provide electrical output signals in response to received incident radiation. A plurality of threshold detectors 818a–818n are provided to receive the electrical outputs of the detectors 816a –816n and to provide an electrical output signal whenever the received electrical signal is greater than a predetermined magnitude. The threshold detectors 818a–818n basically are required to discriminate electrical signals which correspond to incident light intensity on the detectors 816 greater than 2I. In particular, for the three moduli 2, 3 and 5, any detector 816 will receive a light intensity signal of either 0, I, 2I and 3I Electrical signals corresponding to these intensities are fed to the threshold detectors 818 which must discriminate at least between signals corresponding to intensity 3I and those corresponding to intensity 2I and below. The threshold level of the detector is thus adjusted to provide an electrical output signal only when the incident radiation on the corresponding detector is grater than 2I. The output of each threshold detector 818a–818n is wire OR'ed together to provide a single output signal corresponding to the coefficient $a_3$ (either a 0 or 1) corresponding to the binary 8 digit. Similarly constructed converters are provided for the remaining desired binary digits.

FIG. 37 is similar to FIG. 36 and again is seen to comprise the communication paths 81a–81c, detectors 816a–816n and threshold detectors 818a–818n. However, in the case of FIG. 37, an intermediate group of detectors 820a–820f and 822a822j are provided together with an intermediate group of threshold detectors 824a–824f and 826a–826j as well as a corresponding intermediate group of light sources (LED's) 828a–828f and 830a–830j. Detectors 820a–820f are interconnected to receive light from all possible combinations of the light sources 810a–810e whereas detectors 822a–822j are interconnected to receive all possible combinations of light from the light sources 81a, 81b and sources 81f–81j. Detectors 820a–820f and 822a–822j provide electrical output signals corresponding to the intensity of the incident radiation received thereon. Inasmuch as each individual detector 820a–820f and 822a–822j receives only 0, 1 or 2 units of intensity, the corresponding threshold detectors 824a–824f and 826a–826j must discriminate between electrical signals corresponding to radiation greater than I and radiation less than or equal to 2I. The output of threshold detectors 824a–824f and 826a–826j provide electrical output signals to energize the light sources (LED's) 828a–828f and 830a–830j. These light sources provide light along the light transmitting paths 832 and 834 to the detectors 816a–816n. Detectors 816a and 816n provide electrical output signals corresponding to received light intensity to the respective threshold detectors 818a–818n. Threshold detectors 818a–818n also need only discriminate between electrical signals corresponding to intensity greater than I and intensity less than or equal to 2I.

It is understood that the light intensity on the light transmitting paths 819a, 819b, 832 and 834 may be selected to each carry a light intensity of either 0 or I in the same manner as described in relation to the light transmitting paths 812 of FIG. 36.

The basic mode of operation of FIGS. 36 and 37 is described as follows. Each possible digit of the residue number system is represented by the light sources 810a–810j. When a particular residue number is to be converted the light sources corresponding to the particular digits are turned on. Each source is connected to a set of optical fibers, or optical waveguides, and is sized so that when that source is on, each of the fibers, or waveguides, connected to that source contains one unit of intensity. The fibers or waveguides (812a–812j in FIG. 36) from all sources lead to a set of detectors in an interconnection pattern such that each detector will have connections to a unique set of sources. The particular interconnection pattern will depend on the set of residues used in the representation and will also depend on which binary digit is being determined. The interconnection pattern is determined from the representation table such as exemplified in FIG. 35 for the particular moduli 2, 3 and 5 utilized in the exemplary embodiment.

Each detector is followed by a threshold circuit that will turn on when the detector signal level exceeds a preset value. With the given interconnection pattern, one and only one threshold detector will turned on if a desired residue digit pattern is present. If the desired residue pattern is not present, then no threshold detectors will be turned on. Each of the interconnection arrangements shown in FIGS. 36 and 37 is now described in more detail in connection with the representation tables shown in FIG. 35. The example can readily be generalized in a straightforward manner to cover other residue representations and binary digits.

FIG. 36 illustrates a one step interconnection pattern for conversion from the 2, 3, 5 residue representation to the $2^3$ binary digit. The interconnection pattern is derived in the following way from the number representation table of FIG. 35. For very "1" in the $2^3$ binary position, there is a detector 816 labelled with a letter in FIG. 36. These labels are also provided in FIG. 35 in the binary $2^3$ column for ease of description. In FIG. 35, the detectors are labelled in sequential order starting with the first occurrence of a "1" in the $2^3$ column. Each detector is then connected to the sources representing the residue digits for that "1". Detector 816a is connected to sources 810a, 810e and 810i corresponding to the residue representation (0,2,3) since this residue representation 3, results in a "1" bit as the $a_3$ coefficient of the binary term $2^3$. Detector 816b is connected to the sources 810b, 810c and 810j corresponding to the residue representation (1,0,4) since this residue representation corresponds to a "1" value for the coefficient $a_3$ of the binary digit $2^3$. In a similar fashion, the necessary interconnections for all of the detectors 816c–816n to the light sources 810a–810j can be obtained. It may be seen that the last detector (corresponding to decimal number 29) is connected to the sources 810b, 810e and 810j corresponding to the residue representation (1, 2, 4).

In general, if there are K moduli whose product is M, then there are approximately M/2 detectors and KM/2 optical interconnects. The thresholders must be able to discriminate betweeh K and $K-1$ units of intensity in order for this unit to function.

FIG. 37 illustrates the converter unit 800-4 in which the threshold detectors 824, 826 and 818 need only be capable of distinguishing between two units and one unit of intensity. The penalty paid for this decrease in threshold accuracy requirement is that the conversion must be done in a multi-step cascade process rather than a single step. The general procedure for this interconnect scheme is as follows. The moduli are paired so that each modulus is used at least once. Thus, if there are K moduli, then there are approximately K/2 pair couplings in the first stage of this conversion unit. The sources for the digits of each modulus in the pair are interconnected so that there is a detector for every possible combination i.e., for the pair of moduli $m_i$ and $m_j$ there are $m_i m_j$ detectors followed by thresholders. The sets of thresholders are then paired and interconnected in the same manner. This process is repeated until only two sets remain If there were originally K moduli, then there will be approximately lnK/ln2 stages. The interconnect pattern for the final stage is chosen by referring to the number representation table of FIG. 35.

An alternate embodiment for each of the pairs of detectors 816 and threshold detectors 818 of FIG. 36 is to utilize an AND gate configuration as shown in FIG. 38 wherein photo-conductive detectors 850-1 through 850-N are connection series. A load resistor $R_L$ is connected between detector 850-N and ground, and an output terminal 852 is provided between detector 850-N and load resistor $R_L$. FIG. 38 replaces, for example, the detector **816*a* and threshold detector 818*a* of FIG. 36 and may be repeated for the remaining pairs of detectors 816 and threshold detectors 818**.

The operation of FIG. 38 may be considered first in reference to a simple case where N=2. If each detector 850-1 and 850-2 is operated away from saturation, then the resistance can be modeled by $$R_i = \frac{\alpha}{PI + PD} \tag{21}$$

where $R_i$ is the detector resistance of detector **850*i***, $\alpha$ is a parameter with typical value of 100 ohms-watt, $P_D$ is a dark power (relating to the detector dark current) with typical value of $10^{-7}$ watts and $P_I$ is the input power. The voltage across the load resistor $R_L$ is therefore given by $$V_o = V_B R_L/(R_L + R_1 + R_2) \tag{22}$$

If the load resistor is chosen so that when light is present on none or only one of the detectors, the condition $$R_L << R_1 + R_2 \simeq \frac{\alpha}{PD} \tag{23}$$

is true, and when both detectors are illuminated the condition $$R_L >> R_1 + R_2 = \frac{2\alpha}{PI} \tag{24}$$

is true, then the output voltage will be zero and the bias voltage respectively. Thus, the circuit operates as an AND gate. For the applications of interest, both inputs are of equal value and may be scaled together in magnitude so that conditions 23 and 24 can always be met. For the multi-input AND gate shown in FIG. 38, conditions 23 and 24 become $$R_L << R_1 + R_2 + \ldots R_N \simeq \frac{\alpha}{PD} \tag{25}$$

$$R_L >> R_1 + R_2 + \ldots R_N = \frac{N\alpha}{PI} \tag{26}$$

For additional gain enhancement, a variation of the circuit of FIG. 38 for two detectors using FETs is illustrated in FIG. 39. The operation of this circuit relies on the variable resistance of the FETs with input voltage and is otherwise similar to the circuit described in FIG. 38. FIG. 39 may be straightforwardly extended for multi-inputs as in FIG. 38. Other variations on both circuits are possible, with the basic operation relying on multiple series resistances that vary with input illumination.

While the invention has been described with reference to preferred embodiments, it is understood that various modifications and improvements may be made by those skilled in the art without departing from the scope of the invention as defined by the appended claims.

What is claimed is:

1. An optical computing system comprising:

(a) input means for generating first light beams along selected ones of a first plurality of light transmitting paths, each of said first light beams representative of a digit of a number, (b) converter means for converting said first light beams into second light beams selected among a second plurality of light transmitting paths, each of said second light beams representative of a residue of said number modulo a given modulus among a plurality of mutually prime moduli, said converter means generating, for each number, a group of second light beams corresponding to an ordered group of residues modulo each of sad mutually prime moduli, (c) optical computing means coupled to receive said group of second light beams from said converter means for performing parallel residue arithmetic operations corresponding to each ordered group of residues;

(d) said optical computing means generating third light beams selected among a third plurality of light transmitting paths, each of said third light beams representative of a computed number resulting from said arithmetic operations and corresponding to said ordered group of residues modulo each of said mutually prime moduli; and (e) residue-to-binary converter means for converting said third light beams into binary electrical signals representative of a binary value of said computed number.

2. An optical computing system as recited in claim 1 further comprising:

electrical computing means connected to receive said binary electrical signals for performing arithmetic and/or logic operations.

3. An optical computing system as recited in claim 1 or 2 wherein said residue-to-binary converter means includes a converter unit for each binary digit of each binary electrical signal, each converter unit connected in parallel to receive said third light beams along said third plurality of light transmitting path.

4. An optical computing system as recited in claim 3 wherein each converter unit includes means for generating a given binary state of each binary electrical signal only in response to predetermined intensity patterns of incident light from said third plurality of light transmitting paths.

5. An optical computing system as recited in claim 4 wherein said generating means includes:

(1) a plurality of photo-electric detectors, each photo-electric detector positioned to receive said third light beams from selected ones of said third plurality of light transmitting paths, one light beam corresponding to each of said ordered group of residues modulo each of said mutually prime moduli and each photo-electric detector generating an electrical signal having an amplitude corresponding to the intensity of light received along said selected ones of said third plurality of light transmitting paths; and (2) a plurality of threshold detectors, one of said threshold detectors corresponding to each of said photo-electric detectors and connected to receive the electrical signal therefrom, and each threshold detector generating said given binary state of each binary electrical signal only if the amplitude of said electrical signal from said corresponding photo-electric detector is above a predetermined threshold.

6. An optical computing system as recited in claim 3 wherein each converter unit includes:

(1) a plurality of photo-electric detectors, each photo-electric detector positioned to receive said third light beams from selected ones of said third plurality of light transmitting paths, one light beam corresponding to each of said ordered group of residues modulo each of said mutually prime moduli and each photo-electric detector generating an electrical signal having an amplitude corresponding to the intensity of light received along said selected ones of said third plurality of light transmitting paths; and (2) a plurality of threshold detectors, one of said threshold detectors corresponding to each of said photo-electric detectors and connected to receive the electrical signal therefrom, and each threshold detector generating a given binary state of each binary electrical signal only if the amplitude of said electrical signal from said corresponding photo-electric detector is above a predetermined threshold.

7. An optical computing system as recited in claim 5 wherein the intensity of each of said third light beams along said selected ones of said third plurality of light transmitting paths is the same at a given time.

8. An optical computing system as recited in claim 7 wherein said selected ones of said third plurality of light transmitting paths are selected based on the requirement that for every given binary digit, a given binary state of said binary digit corresponds to a unique selection of said third light beams along said third plurality of light transmitting paths, said unique selection corresponding to the residues of said computed number modulo said mutually prime moduli.

9. An optical computing system as recited in claim 6 wherein the intensity of each of said third light beams along said selected ones of said third plurality of light transmitting paths is the same at a given time.

10. An optical computing system as recited in claim 9 wherein said selected ones of said third plurality of light transmitting paths are selected based on the requirement that for every given bit of said binary digit electrical signal, a given binary state of said binary digit corresponds to a unique selection of said third light beams along said third plurality of light transmitting paths, said unique selection corresponding to the residues of said computed number modulo said mutually prime moduli.

11. An optical computing system as recited in claim 3 wherein each converter unit includes:

(1) a first and second plurality to photo-electric detectors, each detector positioned to receive said third light beams from selected ones of said third plurality of light transmitting paths, one light beam corresponding to each of said ordered group of residues modulo each of said mutually prime moduli, each detector generating an electrical signal having an amplitude corresponding to the combined intensity of light received along said selected ones of said third plurality of light transmitting paths, said first plurality of photo-electric detectors connected only to a first group of said third plurality of light transmitting paths corresponding to a first pair of moduli among said mutually prime moduli, and said second plurality of photo-electric detectors connected only to a second group of said third plurality of light transmitting paths corresponding to a second pair of moduli, at least one modulus of which is different from said first pair of moduli;

(2) a third plurality of photo-electric detectors generating electrical signals having an amplitude corresponding to the intensity of light incident thereon;

(3) a first, second, and third plurality of threshold units corresponding to said first, second, and third plurality of photo-electric detectors and connected for receiving corresponding electrical signals therefrom, each of said threshold units generating an electrical threshold signal if the amplitude of the corresponding electrical signal is greater than a predetermined threshold;

(4) a first and second plurality of electro-optical converters corresponding to said first and second plurality of threshold units and connected to receive said electrical threshold signals therefrom, said first and second plurality of electro-optical converters generating fourth light beams in response to said electrical threshold signals;

(5) a fourth plurality of light transmitting paths connected between selected one of said first and second plurality of electro-optical converters and said third plurality of photo-electric detectors for transmitting said fourth light beams therealong; and (6) said third plurality of threshold units generating a given state of a binary electrical signal in response to said electrical threshold signals therefrom.

12. An optical computing system as recited in claim 3 wherein each converter unit includes a plurality of opto-electronic AND gates, each opto-electronic AND gate positioned to receive said third light beams from said selected ones of said third plurality of light transmitting paths, one light beam corresponding to each of said ordered group of residues modulo each of said mutually prime moduli, and outputting a given binary state of said binary electrical signal.

13. An optical computing system as recited in claim 12, wherein each of said opto-electronic AND gates comprises a plurality of photoconductive detectors connected in series between a voltage source and an output terminal, said given binary state of said binary electrical signal provided at said output terminal.

14. An optical computing system as recited in claim 13 further comprising a load resistor connected between said output terminal and ground.

15. An optical computing system as recited in claim 12, wherein each of said opto-electronic AND gates comprises a plurality of field effect transistors (FETs) configured in series between a voltage source and an output terminal, and wherein each gate electrode of said plurality of FETs is coupled to a corresponding one of a plurality of input circuits.

16. An optical computing system as recited in claim 15 further comprising a load resistor connected between said output terminal and ground.

17. An optical computing system as recited in claim 15, wherein each input circuit comprises a series connection of a diode bias voltage source, a diode, a resistor and ground, said gate electrodes being connected to the anode of said diode in said corresponding one of said input circuits.

18. An optical computer as recited in claim 1, wherein said first plurality of light transmitting paths are representative of all of the digits $a_0, a_1 \ldots a_i \ldots a_n$ of a number x, each digit $a_i$ having an associated weight $w_i$ such that $$x = \sum_{i=0}^{n} a_i w_i,$$

where n is an integer and wherein the number of said first plurality of light transmitting paths is equal to the base of the number x multiplied by (n+1).

19. An optical computer as recited in claim 1, wherein ones of said second plurality of light transmitting paths corresponding to each modulus are positionally encoded such that their relative position corresponds to the value of the residue of said number modulo a given modulus.

20. An optical computer as recited in claim 1, wherein said optical computing means includes an arithmetic logic unit (ALU) for each of said mutually prime moduli and each of said ALU's has a first input channel for receiving ones of said second plurality of light transmitting paths corresponding to a first number and a second input channel for receiving others of said second plurality of light transmitting paths corresponding to a second number.

21. An optical computer as recited in claim 20, wherein for each ALU, said first and second input channels form, respectively, a first and second plurality of input light sources arranged in a straight line and separated from one another by an equal distance d, said second light beams passing along said second plurality of light transmitting paths forming specific spatial patterns corresponding to said first and second numbers, each of said ALU's further including:

an optical system having a plurality of channels for maximally passing light from said specific spatial pattern through only one channel of said optical system, each optical system channel having a plurality of linear optical elements; and means for detecting light that was maximally passed through the optical system and, thereby, recognizing the specific spatial pattern.

22. An optical computer as recited in claim 21, wherein each channel of said optical system comprises:

a first optical element in a first focal plane one focal length away from said first and second plurality of input light sources;

a filter element in a second focal plane one focal length away from said first optical element; and a second optical element in a third focal plane one focal length away from said filter element.

23. An optical computer as recited in claim 22, herein said detecting means comprises a detector for each channel of said optical system, each detector located in a fourth focal plane one focal length away from said second optical element.

24. An optical computer as recited in claim 23, wherein said first optical element comprises a spherical lens.

25. An optical computer as recited in claim 20, wherein, for each ALU, said first and second input channels form a first and second plurality of input light sources, respectively, and each ALU further comprises:

a first and second plurality of optical paths coupled to said first and second plurality of input light sources, respectively;

means for combining light from at least a first optical path from said first plurality of optical paths with light from at least a second optical path from said second plurality of optical paths at an intersecting region;

means for discriminating light intensity at said intersecting region between:

(1) a first state, wherein a first level of light intensity is detected resulting from light transmitted to the detecting means from only one or none of said first and second optical paths, and (2) a second state, wherein a second level of light intensity is detected resulting from light transmitted to the detecting means from both of said first and second optical paths, wherein said first and second states indicated an output state of the optical logic or arithmetic operation.

26. An optical computer as recited in claim 25, wherein said light sources are point sources.

27. An optical computer as recited in claim 25, wherein said optical paths comprise optical fibers.

28. An optical computer as recited in claim 25, wherein said optical paths comprise waveguides in an integrated optics package.

29. An optical computer as recited in claim 28, wherein said detecting means includes an optical bistable element at said intersecting region.

30. An optical computer as recited in claim 29, further including means for providing a sampling beam of light incident on said intersecting region whereby when said optical bistable element detects said second state, said optical bistable element permits the sampling beam to pass through said intersecting region and otherwise blocks passage of said sampling beam.

31. An optical computer as recited in claim 25, wherein said intersection region is formed when said first optical path from said first plurality of optical paths is oriented at an angle of approximately 90° with respect to said second optical path from said second plurality of optical paths.

32. An optical computer as recited in claim 25, wherein said discriminating means comprises an electronic thresholding means.

33. A hybrid optical-electrical computing system comprising:

(a) input means for generating first light beams along selected ones of a first plurality of light transmitting paths, each of said first light beams representative of a digit of a number, (b) converter means for converting said first light beams into second light beams selected among a second plurality of light transmitting paths, each of said second light beams representative of a residue of said number modulo a given modulus among a plurality of mutually prime moduli, said converter means generating, for each number, a group of second light beams corresponding to an ordered group of residues modulo each of said mutually prime moduli, and (c) data processing means including:

(1) optical computing means coupled to receive said group of second light beams from said converter means for performing parallel residue arithmetic operations corresponding to each ordered group of residues; said optical computing means generating third light beams selected among a third plurality of light transmitting paths, each of said third light beams representative of a computed number resulting from said arithmetic operations and corresponding to said ordered group of residues modulo each of said mutually prime moduli;

(2) residue-to-binary converter means for converting said third light beams into binary electrical signals representative of a binary value of said computed number; and (3) electrical computing means connected for receiving said binary electrical signals for performing at least one of logical and additional arithmetic operations.

34. A hybrid optical-electric computing system recited in claim 33 wherein said residue-to-binary converter means includes a converter unit for each bit of said binary electrical signals, each converter unit connected in parallel to receive said third light beams along said third plurality of light transmitting paths.

35. A hybrid optical–electric computing system as recited in claim 34 wherein each converter unit includes means for generating a given binary state of given binary electrical signal only in response to a predetermined intensity of incident light from said third plurality of light transmitting paths.

36. A hybrid optical-electric computing system as recited in claim 35 wherein each generating means includes:

(1) a plurality of photo-electric detectors, each photo–electric detector positioned to receive said third light beams from selected ones of said third plurality of light transmitting paths, one light beam corresponding to each of said ordered groups of residue modulo and said mutually prime moduli, and each photo–electric detector generating an electrical signal having an amplitude corresponding to the intensity of light received along said selected ones of said third plurality of light transmitting paths; and (2) a plurality of threshold detectors, one of said threshold detectors corresponding to each of said photo-electric detectors and connected to receive the electrical signal therefrom, and each threshold detector generating said given binary state of said binary electrical signals only if the amplitude of said electrical signal from said corresponding photo–electric detector is above a predetermined threshold.

37. A hybrid optical-electrical computing system as recited in claim 36 wherein the intensity of each of said third light beams along said selected ones of said third plurality of light transmitting paths is the same at a given time.

38. A hybrid optical-electrical computing system as recited in claim 37 wherein said selected ones of said third plurality of light transmitting paths are selected based on the requirement that for every given bit, a given binary state of said bit corresponds to a unique selection of said third light beams along said third plurality of light transmitting paths, said unique selection corresponding to the residues of said computed number modulo said mutually prime moduli.

39. A hybrid optical-electrical computing system as recited in claim 34 wherein each converter unit includes:

(1) a plurality of photo-electric detectors, each photo-electric detector positioned to receive said third light beams from selected ones of said third plurality of light transmitting paths, one light beam corresponding to each of said ordered groups of residue modulo and said mutually prime moduli, and each photo–electric detector generating an electrical signal having an amplitude corresponding to the intensity of light received along said selected one of said third plurality of light transmitting paths; and (2) a plurality of threshold detectors, ones of said threshold detectors corresponding to each of said photo–electric detectors and connected to receive the electrical signal therefrom, and each threshold detector generating a given binary state of said binary electrical signal only if the amplitude of said electrical signal from said corresponding photo-electric detector is above predetermined threshold.

40. A hybrid optical-electrical computing system as recited in claim 39 wherein the intensity of each of said third light means along said selected ones of said third plurality of light transmitting paths is the same at a given time.

41. A hybrid optical-electrical computing system as recited in claim 40 wherein said selected ones of said third plurality of light transmitting paths are selected based on the requirement that for every given bit of said binary electrical signal, a given binary state of said bit corresponds to a unique selection of said third light beams along said third plurality of light transmitting paths, said unique selection corresponding to the residues of said computed number modulo said mutually prime moduli.

42. A hybrid optical-electrical computing system as recited in claim 34 wherein each converter unit includes:

(1) a first and second plurality of photo–electric detectors, each detector positioned to receive said third light beams from selected ones of said third plurality of light transmitting paths, one light beam corresponding to each of said ordered group of residues modulo each of said mutually prime moduli, each detector generating an electrical signal having an amplitude corresponding to the combined intensity of light received along said selected ones of said third plurality of light transmitting paths, said first plurality of photo–electric detectors connected only to a first group of said third plurality of light transmitting paths corresponding to a first pair of moduli among said mutually prime moduli, and said second plurality of photo–electric detectors connected only to a second group of said third plurality of light transmitting paths corresponding to a second pair of moduli, at least one modulus of which is different from said first pair of moduli;

(2) a third plurality of photo-electric detectors generating electrical signals having an amplitude corresponding to the intensity of light incident thereon;

(3) a first, second, and third plurality of threshold units corresponding to said first, second, and third plurality of photo-electric detectors and connected for receiving corresponding electrical signals therefrom, each of said threshold units generating an electrical threshold signal if the amplitude of the corresponding electrical signal is greater than a predetermined threshold;

(4) a first and second plurality of elector-optical converters corresponding to said first and second plurality of threshold units and connected to receive said electrical threshold signals therefrom, said first and second plurality of electro-optical converters generating fourth light beams in response to said electrical threshold signals;

(5) a fourth plurality of light transmitting paths connected between selected one of said first and second plurality of electro-optical converters and said third plurality of photo-electric detectors for transmitting said fourth light beams therealong; and (6) said third plurality of threshold units generating a given state of said binary electrical signal in response to said electrical threshold signals therefrom.

43. An optical computing system as recited in claim 34 wherein each converter unit includes a plurality of opto-electronic AND gates, each opto-electronic AND gate positioned to receive said third light beams from said selected ones of said third plurality of light transmitting paths, one light beam corresponding to each of said ordered group of residues modulo each of said mutually prime moduli, and outputting a given binary state of said binary electrical signal.

44. An optical computing system as recited in claim 43, wherein each of said opto-electronic AND gates comprises a plurality of photoconductive detectors connected in series between a voltage source and an output terminal, said given binary state of said binary electrical signal provided at said output terminal.

45. An optical computing system as recited in claim 44 further comprising a load resistor connected between said output terminal and ground.

46. An optical computing system as recited in claim 43, wherein each opto-electronic AND gate comprises a plurality of field effect transistors (FETs) connected in series between a voltage source and an output terminal, and wherein each gate electrode of said plurality of FETs is coupled to a corresponding one of a plurality of input circuits.

47. AN optical computing system as recited in claim 46 further comprising a load resistor connected between said output terminal and ground.

48. An optical computing system as recited in claim 46, wherein each input circuit comprises a series connection of a diode bias voltage source, a diode, a resistor and ground, said gate electrodes being connected to the anode of said diode in said corresponding one of said input circuits.

49. An opto-electric residue-to-binary converter comprising:

(1) a plurality of converter units, one converter unit corresponding to each binary digit and providing a binary electrical output signal corresponding thereto;

(2) a plurality of groups of light sources for each converter unit, each group within a converter unit having a corresponding plurality of individually energizable light sources representative of residues of a number modulo a given modulus, the residues of each group being mutually prime relative to one another wherein said number is represented in a residue number representation by said energizable light sources;

(3) means for connecting each converter unit in parallel such that corresponding individually energizable light sources within each converter unit are simultaneously energized for converting said number from said residue number representation into binary;

(4) each of said converter units further comprising:

(a) a plurality of light transmitting paths for each group of light sources, (b) a plurality of photo-electric detectors each receiving light from selected ones of said light transmitting paths, each photo-electric detector generating an electrical signal having an amplitude corresponding to the intensity of light received along said selected ones of said plurality of light transmitting paths, each of said photo-electric detectors receiving light from said selected light transmitting paths such that for every given binary digit of said binary electric signal, a given binary state of said binary digit corresponds to a unique selection of said light transmitting paths corresponding to the residues of said number modulo said mutually prime moduli, and (d) a plurality of threshold detectors, one of said threshold detectors corresponding to each of said photo-electric detectors and connected for receiving said electrical signal therefrom and each threshold detector generating a given binary state of said binary electrical output signal only if the amplitude of said electrical signal from said corresponding photoelectric detector is above a predetermined threshold.

50. An opto-electric residue-to-binary converter as recited in claim 49 wherein the intensities of light along each of said plurality of light transmitting path which are energized by said corresponding light sources are the same.

51. An opto-electric residue-to-binary converter as recited in claim 47 wherein each photoelectric detector of each converter receives light from each one of said plurality of groups of light sources.

52. An opto-electric residue-to-binary converter comprising:

(1) a plurality of converter units, one converter unit corresponding to each binary digit and providing a binary electrical output signal corresponding thereto;

(2) a plurality of individually energizable light sources representative of residues of a number modulo a plurality of mutually prime moduli wherein said number is represented in a residue number representation by said energizable light sources;

(3) means for connecting each converter unit in parallel such that corresponding individually energizable light sources within each converter unit are simultaneously energized for converting said number from said residue number representation into binary;

(4) a plurality of light transmitting paths, each light transmitting path connected to transmit light from one of said light sources;

(5) a first and second plurality of photo-electric detectors, each detector receiving light from selected ones of said plurality of light transmitting paths and generating an electrical signal having an amplitude corresponding to the combined intensity of light received along said selected one of said light transmitting paths, said first plurality of photo-electric detectors connected only to a first group of said plurality of light transmitting paths corresponding to a first pair of moduli among said mutually prime moduli and said second plurality of photo-electric detectors connected only to a second group of said plurality of light transmitting paths corresponding to a second pair of moduli, at least one modulus of which is different from said first pair of moduli;

(6) a third plurality of photo-electric detectors generating electrical signals having an amplitude corresponding to the intensity light incident thereon;

(7) a first, second and third plurality of threshold units corresponding to said first, second and third plurality of photo-electric detectors and connected for receiving corresponding electrical signals therefrom, each of said threshold units generating an electrical threshold signal if the amplitude of the corresponding receive signal is greater that a predetermined threshold;

(8) a first and second plurality of electro-optic converters corresponding to said first and second plurality of threshold units and connected to receive said electrical threshold signal therefrom, said first and second plurality of electro-optical converters generating light beams in response to said electrical threshold signals;

(9) an additional plurality of light transmitting paths connected between selected one of said first and second plurality of electro-optical converters and said third plurality of photo-electric detectors for transmitting said light beams therealong; and

(10) said third plurality of threshold units generating a given state of a binary electrical signal in response to said electrical threshold signals therefrom.

53. A method of optical computing comprising the steps of:

(a) generating first light beams along selected ones of a first plurality of light transmitting paths, each of said first light beams representative of a digit of a number, (b) converting said first light beams into second light beams selected among a second plurality of light transmitting paths, each of said second light beams representative of a residue of said number modulo a given modulus among a plurality of mutually prime moduli, and generating, for each number, a group of second light beams corresponding to an ordered group of residues modulo each of said mutually prime moduli, (c) performing parallel residue arithmetic operation corresponding to each ordered group of residues utilizing computing means coupled to receive said group of second light beams, (d) generating third light beams selected among a third plurality of light transmitting paths, each of said third light beams representative of a computed number resulting from said arithmetic operations and corresponding to said ordered group of residues modulo each of said mutually prime moduli; and (e) converting said third light beams into binary electrical signals representative of a binary value of said computed number.

54. A method as recite in claim 53 further comprising the step of performing arithmetic an logic operations utilizing electrical computing means connected for receiving the binary electrical signals.

55. A method of opto-electric residue-to-binary converting comprising the steps of:

(1) providing a plurality of converter units, one converter unit corresponding to each binary digit and providing a binary electrical output signal corresponding thereto;

(2) providing a plurality of groups of light sources for each converter unit, each group within a converter unit having a corresponding plurality of individually energizable light sources representative of residues of a number modulo a given modulus, the residues of each group being mutually prime relative to one another wherein said number is represented in a residue number representation by said energizable light sources;

(3) connecting each converter unit in parallel such that corresponding individually energizable light sources within each converter unit are simultaneously energized for converting said number from said residue number representation into binary;

(4) for each of said converter units further providing:

(a) a plurality of light transmitting paths for each group of light sources, (b) a plurality of photo-electric detectors each receiving light from selected ones of said light transmitting paths, each photo-electric detector generating a electrical signal having an amplitude corresponding to the intensity of light received along said selected ones of said plurality of light transmitting path;;

(c) each of said photo-electric detectors receiving light from said selected light transmitting paths such that for every given binary digit of said binary electrical output signal, a given binary state of said binary digit corresponds to a unique selection of said light transmitting paths corresponding to the residues of said number modulo said mutually prime moduli; and (d) a plurality of threshold detectors, one of said threshold detectors corresponding to each of said photo-electric detectors and connected for receiving said electrical signal therefrom and each threshold detector generating a given binary state of said binary electrical output signal only if the amplitude of said electrical signal from said corresponding photoelectric detector is above a predetermined threshold.

56. An opto-electric residue-to-binary converter comprising:

a plurality of converter units, each converter unit corresponding to each binary digit and providing a binary electrical output signal corresponding thereto;

a plurality of groups of light sources for each converter unit, each group within a converter unit having a corresponding plurality of individually energizable light sources representative of residues of a number modulo a given modulus, the residues of each group being mutually prime relative to one another wherein said number is represented in a residue number representation by said energizable light sources;

means for connecting each converter unit in parallel such that corresponding individually energizable light sources within each converter unit are simultaneously energized for converting said number from said residue number representation into binary;

each of said converter units further comprising:

a plurality of light transmitting paths for each group of light sources, a plurality of opto-electronic AND gates each receiving light from selected ones of said light transmitting paths, each of said photo-electronic AND gates receiving light from said selected light transmitting paths such that for every given binary digit of said binary electric signal, a given binary state of said binary digit corresponds to a unique selection of said light transmitting paths corresponding to the residues of said number modulo said mutually prime moduli, each of said plurality of opto-electronic AND gates outputting a given binary state of said binary electrical signal.

* * * * *